United States Patent
Yoshimoto et al.

(10) Patent No.: US 8,381,060 B2
(45) Date of Patent: Feb. 19, 2013

(54) COMMUNICATION DEVICE, COMMUNICATION SYSTEM, RECEPTION METHOD, AND COMMUNICATION METHOD

(75) Inventors: Takashi Yoshimoto, Osaka (JP); Toshizo Nogami, Osaka (JP); Ryota Yamada, Osaka (JP); Kazuyuki Shimezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 12/991,935
(22) PCT Filed: May 14, 2009
(86) PCT No.: PCT/JP2009/058997
§ 371 (c)(1), (2), (4) Date: Nov. 10, 2010

(87) PCT Pub. No.: WO2009/139442
PCT Pub. Date: Nov. 19, 2009

(65) Prior Publication Data
US 2011/0066911 A1 Mar. 17, 2011

(30) Foreign Application Priority Data
May 15, 2008 (JP) .................................. 2008-128582

(51) Int. Cl.
*H04L 1/18* (2006.01)
(52) U.S. Cl. .................... 714/748; 714/751; 714/749
(58) Field of Classification Search ................. 714/748, 714/751, 749, 752, 750, 799, 701
See application file for complete search history.

(56) References Cited

U.S. PATENT DOCUMENTS

| | | | | |
|---|---|---|---|---|
| 7,447,968 | B2 * | 11/2008 | Ha et al. | 714/748 |
| 7,730,382 | B2 * | 6/2010 | Garrett et al. | 714/762 |
| 7,826,557 | B2 | 11/2010 | Li et al. | |
| 2005/0283701 | A1 * | 12/2005 | Kim | 714/748 |
| 2010/0238818 | A1 | 9/2010 | Takaoka et al. | |

FOREIGN PATENT DOCUMENTS

| | | |
|---|---|---|
| EP | 2 109 243 A1 | 10/2009 |
| JP | 2007-184926 A | 7/2007 |
| WO | WO 2006/064857 A1 | 6/2006 |
| WO | WO 2007/061016 A1 | 5/2007 |
| WO | WO 2008/093619 A1 | 8/2008 |
| WO | WO 2009/047910 A1 | 4/2009 |

OTHER PUBLICATIONS

D. Chase, "Code Combining—A Maximum-Likelihood Decoding Approach for Combining an Arbitrary Number of Noisy Packets", IEEE Translations on Communications, vol. Comm-33, No. 5, pp. 385-393, May 1985. J. Hagenauer, "Rate-Compatible Punctured Convolutional Codes (RCPC Codes) and their Applications", IEEE Translations on Com-munications, vol. 36, No. 4, pp. 389-400, Apr. 1988.
K. Akita et al., "New Interference Cancellers for Downlink MC-CDMA with Trasmit Power Control", Technical Report of IEICE, RCS2002-35, CQ2002-35, Apr. 2002, pp. 105-110.
K. Ishihara et al., "DS-CDMA Frequency-domain Multi-access Interference Canceller", Technical Report of IEICE, RCS2004-316, Jan. 2005.

* cited by examiner

*Primary Examiner* — Fritz Alphonse
(74) *Attorney, Agent, or Firm* — Birch, Stewart, Kolasch & Birch, LLP

(57) ABSTRACT

Provided is a communication device which performs a hybrid automatic repeat request process of requesting a transmission source to perform retransmission when an error is detected from a received signal. The communication device includes: a reception unit that receives a signal into which an initial transmission signal and a retransmission signal are multiplexed among signals including the initial transmission signal and the retransmission signal for any one signal; a detection order decision unit that decides an order of detection of the initial transmission signal and the retransmission signal from the signal received by the reception unit in response to the number of retransmissions of the initial transmission signal and the retransmission signal which are included in the signal received by the reception unit; and a signal detection unit that removes an interference component from the signal received by the reception unit by using a signal detected by the communication device according to the order decided by the detection order decision unit, and that detects the initial transmission signal and the retransmission signal. An increase of delay can be prevented when retransmission is repeated.

20 Claims, 16 Drawing Sheets

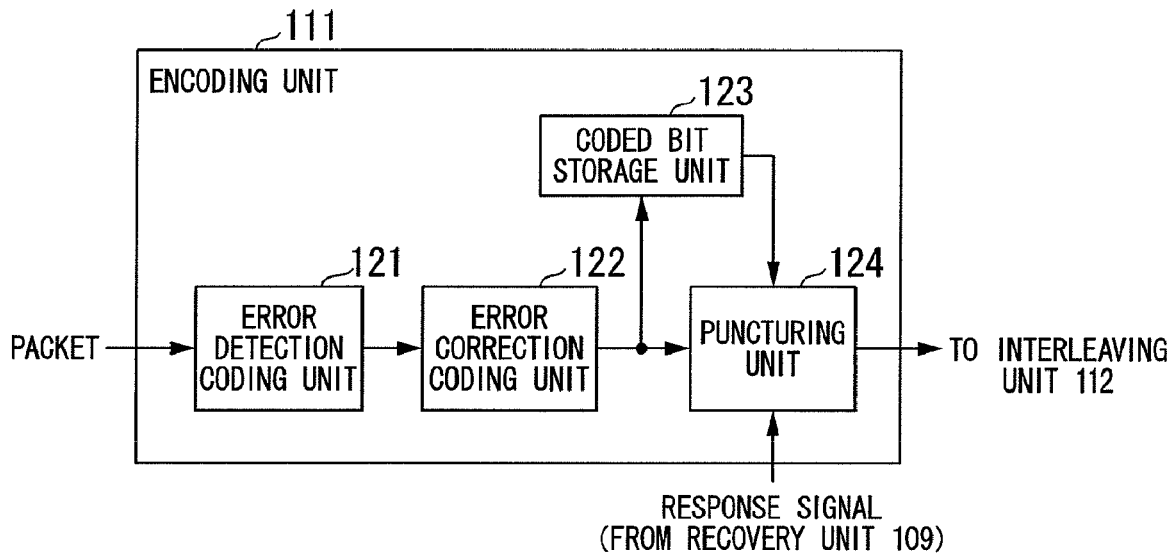
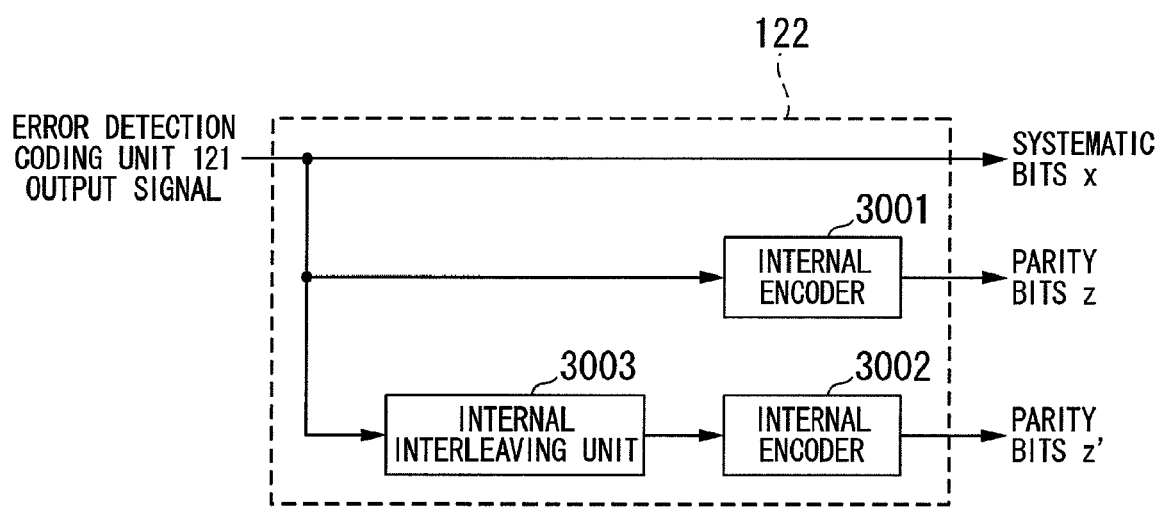

FIG. 4

| | PATTERN 1 | PATTERN 2 |
|---|---|---|
| R=3/4 | $\begin{pmatrix} x \\ z \\ z' \end{pmatrix} = \begin{pmatrix} 111111 \\ 100000 \\ 000100 \end{pmatrix}$ | $\begin{pmatrix} x \\ z \\ z' \end{pmatrix} = \begin{pmatrix} 000000 \\ 011110 \\ 110011 \end{pmatrix}$ |

FIG. 5

| | PATTERN 1 | PATTERN 2 |
|---|---|---|
| R=3/4 | $\begin{pmatrix} x \\ z \\ z' \end{pmatrix} = \begin{pmatrix} 101101 \\ 110000 \\ 000110 \end{pmatrix}$ | $\begin{pmatrix} x \\ z \\ z' \end{pmatrix} = \begin{pmatrix} 010010 \\ 001110 \\ 110001 \end{pmatrix}$ |

COMMUNICATION DEVICE, COMMUNICATION SYSTEM, RECEPTION METHOD, AND COMMUNICATION METHOD

TECHNICAL FIELD

The present invention relates to a communication device, a communication system, a reception method, and a communication method, and more particularly to a communication device, a communication system, a reception method, and a communication method to which automatic repeat request control is applied.

Priority is claimed on Japanese Patent Application No. 2008-128582, filed May 15, 2008, the content of which is incorporated herein by reference.

BACKGROUND ART

Hybrid automatic repeat request (HARQ), in which automatic repeat request (ARQ) disclosed in Non-patent Documents 1 and 2 and error correction coding such as turbo coding are combined, is an example of an error control technique in communication systems. HARQ is a technique by which a receiver requests a transmitter to perform retransmission when detecting an error from a received signal, and performs a decoding process on a combined signal of a signal received again and a previously received signal. In particular, since redundant bits are divided and sequentially retransmitted bit by bit in incremental redundancy (IR) as one type of HARQ, it is possible to decrease the coding rate and enhance the error correction capability according to an increase of the number of retransmissions.

On the other hand, a multi carrier-code division multiplexing (MC-CDM) scheme, a spread-orthogonal frequency division multiplexing (spread-OFDM) scheme, and the like are examples of combinations of a multi-carrier transmission scheme such as orthogonal frequency division multiplexing (OFDM) and a code division multiplexing (CDM) scheme. In these schemes, good characteristics are obtained under multipath fading environments by arranging coded and spreading code-multiplied data over subcarriers and acquiring the effect of frequency diversity. Multi-code interference (MCI) due to the destruction of orthogonality between spreading codes upon code multiplexing occurs and becomes the cause of characteristic degradation.

As a technique for solving this problem, for example, a successive interference canceller (SIC) is disclosed in Non-patent Documents 3 and 4. The SIC disclosed in Non-patent Documents 3 and 4 uses a technique of performing signal detection by performing despreading, demodulation, and decoding in order from a channel signal of which received signal power or a received signal to interference plus noise power ratio (SINR) is high among code-multiplexed received signals, obtaining a determination signal of an information symbol, and subtracting an interference signal replica (undesired signal) created using a determination result thereof from a received signal. By iterating this procedure, it is possible to accurately remove a signal serving as an interference signal other than a desired code channel and suppress characteristic degradation due to the destruction of orthogonality between spreading code sequences.

[Related Art Document]
[Non-patent Document]
[Non-patent Document 1] D. Chase, "Code combining-A maximum likelihood decoding approach for combining and arbitrary number of noisy packets" IEEE Trans. Commun., vol. COM-33, pp. 385-393, May 1985.
[Non-patent Document 2] J. Hagenauer, "Rate-compatible punctured convolutional codes (RCPC codes) and their application", IEEE Trans. Commun., vol. 36, pp. 389-400, April 1988.
[Non-patent Document 3] Ishihara, Takeda, and Adachi, "DS-CDMA Frequency Domain MAI Canceller," The Institute of Electronics, Information and Communication Engineers, technical report RCS 2004-316, January 2005.
[Non-patent Document 4] Akita, Suyama, Fukawa, and Suzuki, "Interference Canceller in Downlink Using Transmission Power Control of MC-CDMA," The Institute of Electronics, Information and Communication Engineers, technical report RCS 2002-35, April 2002.

DISCLOSURE OF THE INVENTION

Problems to be Solved by the Invention

However, in communication systems using the above-described ARQ control, retransmission is requested even when a receiving side uses the SIC, an error is detected from a result of a decoding process for a combined signal of a signal received again and a previously received signal if interference cancellation from the signal received again is not sufficient, and retransmission is requested once more. There is a problem in that retransmission is repeated and consequently delay is increased.

The present invention has been made in view of the above-described circumstances, and an object of the invention is to provide a communication device, a communication system, a reception method, and a communication method that prevent an increase of delay when retransmission is repeated.

Means for Solving the Problems (1) According to the present invention, there is provided a communication device which performs a hybrid automatic repeat request process of requesting a transmission source to perform retransmission when an error is detected from a received signal, the communication device including: a reception unit that receives a signal into which an initial transmission signal and a retransmission signal are multiplexed among signals including the initial transmission signal and the retransmission signal for any one signal; a detection order decision unit that decides an order of detection of the initial transmission signal and the retransmission signal from the signal received by the reception unit in response to information for determining the initial transmission signal or the retransmission signal from the initial transmission signal and the retransmission signal which are received by the reception unit; and a signal detection unit that removes an interference component from the signal received by the reception unit by using a signal detected by the communication device according to the order decided by the detection order decision unit, and that detects the initial transmission signal and the retransmission signal.

(2) In the above-described communication device according to the present invention, the detection order decision unit decides the detection order so that the initial transmission signal is detected before the retransmission signal.

(3) In the above-described communication device according to the present invention, the detection order decision unit further uses a reception level when deciding the order of detection.

(4) In the above-described communication device according to the present invention, the initial transmission signal and the retransmission signal are signals error-correction coded in the transmission source, and the signal detection unit generates, when the signal is detected, a replica signal of an interference component to a signal serving as a detection target by using a signal obtained by performing an error correction decoding process using an error correction code on the signal detected by the device, and removes the replica signal from the signal received by the reception unit.

(5) In the above-described communication device according to the present invention, the signal detection unit removes, when the signal is detected, an interference component from the signal received by the reception unit by using all signals detected by the signal detection unit.

(6) In the above-described communication device according to the present invention, the signal detection unit removes, when the retransmission signal is detected, an interference component from the signal received by the reception unit by using the initial transmission signal among signals detected by the signal detection unit.

(7) In the above-described communication device according to the present invention, the signal received by the reception unit is a code-multiplexed signal in which the initial transmission signal and the retransmission signal are respectively multiplied by unique spreading codes, and the signal detection unit removes an interference component from the signal received by the reception unit, multiplies the signal from which the interference component is removed by the spreading code unique to a signal serving as a detection target, and detects the signal serving as the detection target.

(8) In the above-described communication device according to the present invention, the signal received by the reception unit is a signal in which the initial transmission signal and the retransmission signal are transmitted from different antennas and spatially multiplexed, and the signal detection unit removes an interference component from the signal received by the reception unit and detects, based on a channel estimation value of each antenna, a signal serving as a detection target from the signal from which the interference component is removed.

(9) In the above-described communication device according to the present invention, the signal detection unit performs detection of the initial transmission signal and the retransmission signal for each signal once according to the order decided by the detection order decision unit.

(10) In the above-described communication device according to the present invention, the signal detection unit iterates detection of the initial transmission signal and the retransmission signal a plurality of times according to the order decided by the detection order decision unit.

(11) In the above-described communication device according to the present invention, the signal detection unit outputs a soft decision value of a detected signal, and the communication device includes: a received signal storage unit that stores the soft decision value outputted by the signal detection unit; and a combining unit that combines the soft decision value outputted by the signal detection unit with a soft decision value of an initial transmission signal for the signal of the soft decision value outputted by the signal detection unit or a soft decision value of a retransmission signal for the initial transmission signal among soft decision values stored in the received signal storage unit.

(12) In the above-described communication device according to the present invention, the soft decision value outputted by the signal detection unit is a demodulation result.

(13) In the above-described communication device according to the present invention, the soft decision value outputted by the signal detection unit is a decoding result.

(14) In the above-described communication device according to the present invention, the information for determining the initial transmission signal or the retransmission signal is information indicating the number of retransmissions.

(15) In the above-described communication device according to the present invention, the reception unit receives a received signal including a retransmission control signal, and the information for determining the initial transmission signal or the retransmission signal is written to the retransmission control signal.

(16) According to the present invention, there is provided a communication system which includes a first communication device and a second communication device, and performs a hybrid automatic repeat request process in which the second communication device requests the first communication device to perform retransmission when an error is detected from a signal received from the first communication device, the second communication device including: a reception unit that receives a signal into which an initial transmission signal and a retransmission signal are multiplexed among signals including the initial transmission signal and the retransmission signal for any one signal; a detection order decision unit that decides an order of detection of the initial transmission signal and the retransmission signal from the signal received by the reception unit in response to information for determining the initial transmission signal or the retransmission signal from the initial transmission signal and the retransmission signal which are received by the reception unit; and a signal detection unit that removes an interference component from the signal received by the reception unit by using a signal detected by the communication device according to the order decided by the detection order decision unit, and detecting the initial transmission signal and the retransmission signal.

(17) In the above-described communication system according to the present invention, the initial transmission signal and the retransmission signal are signals of error correction-coded information, and the signal detection unit generates, when the signal is detected, a replica signal of an interference component to a signal serving as a detection target by using a signal obtained by performing an error correction decoding process using the error correction code on the signal detected by the device, and removes the replica signal from the signal received by the reception unit.

(18) According to the present invention, there is provided a communication method for a communication device which performs a hybrid automatic repeat request process of requesting a transmission source to perform retransmission when an error is detected from a received signal, the communication method including: a first process of receiving, by the communication device, a signal into which an initial transmission signal and a retransmission signal are multiplexed among signals including the initial transmission signal and the retransmission signal for any one signal; a second process of deciding, by the communication device, an order of detection of the initial transmission signal and the retransmission signal from the signal received in the first process in response to information for determining the initial transmission signal or the retransmission signal from the initial transmission signal and the retransmission signal which are received in the first process; and a third process of removing, by the communication device, an interference component from the signal received in the first process by using a signal detected by the communication device according to the order decided in the second process, and detecting the initial transmission signal and the retransmission signal.

(19) According to the present invention, there is provided a communication method for a communication system which includes a first communication device and a second communication device, and performs a hybrid automatic repeat request process in which the second communication device requests the first communication device to perform retransmission when an error is detected from a signal received from the first communication device, the communication method including: a first process of transmitting, by the first communication device, an initial transmission signal and a retransmission signal for any one signal; a second process of receiving, by the second communication device, a signal into which the initial transmission signal and the retransmission signal are multiplexed among signals transmitted in the first process; a third process of deciding, by the second communication device, an order of detection of the initial transmission signal and the retransmission signal from the signal received in the second process in response to information for determining the initial transmission signal or the retransmission signal from the initial transmission signal and the retransmission signal which are received in the second process; and a fourth process of removing, by the second communication device, an interference component from the signal received in the second process by using a signal detected by the second communication device according to the order decided in the third process, and detecting the initial transmission signal and the retransmission signal.

(20) In the above-described communication device according to the present invention, the detection order decision unit decides the order of detection such that signals are detected in a descending order of the number of retransmissions.

Effects of the Invention

According to the present invention, a detection order decision unit decides a detection order in response to the number of retransmissions for signals interfering with each other, and a signal detection unit removes an interference component from a signal received by a reception unit by using signals detected according to the order and detects an initial transmission signal and a retransmission signal. Thus, the detection order is advanced as the number of retransmissions is smaller, and accordingly, when signal detection is performed on a retransmission signal of which the number of retransmissions is large, the signal detection is performed on a signal from which more interference components are removed, thereby performing signal detection with high accuracy. Accordingly, delay can be prevented from being increased due to the number of retransmissions of a specific signal being increased.

BRIEF DESCRIPTION OF THE DRAWINGS

FIG. 2 is a schematic block diagram showing the configuration of an encoding unit 111 according to the same embodiment.

FIG. 3 is a schematic block diagram showing the internal configuration of an error correction coding unit 122 according to the same embodiment.

FIG. 4 is a diagram showing an example of puncturing patterns in the error correction coding unit 122 according to the same embodiment.

FIG. 5 is a diagram showing another example of puncturing patterns different from those of FIG. 4 in the error correction coding unit 122 according to the same embodiment.

BEST MODE FOR CARRYING OUT THE INVENTION

First Embodiment

The first embodiment of the present invention will now be described with reference to the drawings. In a packet communication system to which an MC-CDM scheme and a HARQ process of requesting a transmission source to perform retransmission if an error is detected from a received signal are applied in this embodiment, a packet transmission device 100 transmits a signal in which an initial transmission packet and a retransmission packet related to any one initial transmission packet before the initial transmission packet are code-multiplexed, and a packet reception device 200 having an SIC using an iterative process receives the signal transmitted by the packet transmission device 100 and detects the signals in order, in which the signal of the initial transmission packet among the code-multiplexed signals is preferentially detected. The retransmission packet is a packet for retransmitting data related to the same data as data transmitted by an initial transmission packet.

Here, the interference signal is an interference signal due to inter-code interference, and means the other code-multiplexed signal. That is, for example, if signals $P_1$ and $P_2$ are code-multiplexed, the signal $P_2$ is an interference signal to the signal $P_1$ and the signal $P_1$ is an interference signal to the signal $P_2$. That is, the signals $P_1$ and $P_2$ are code-multiplexed and become signals interfering with each other. The signal detection is a process of separating codes by performing a series of processes of channel distortion correction, despreading, and demodulation necessary to obtain information bits after an interference cancellation process of reproducing an interference signal to a signal to be detected and removing the reproduced signal (replica) from a received signal. For example, when the signal $P_2$ is detected, signal detection is performed by code-separating the signal $P_2$ after removing the replica of the signal $P_1$ from the received signal. In this regard, since it is necessary to detect the signal so as to generate the above-described reproduced signal (replica), signal detection is performed by code-separating (despreading) the received signal without performing the interference cancellation process in first signal detection.

Figure 1:
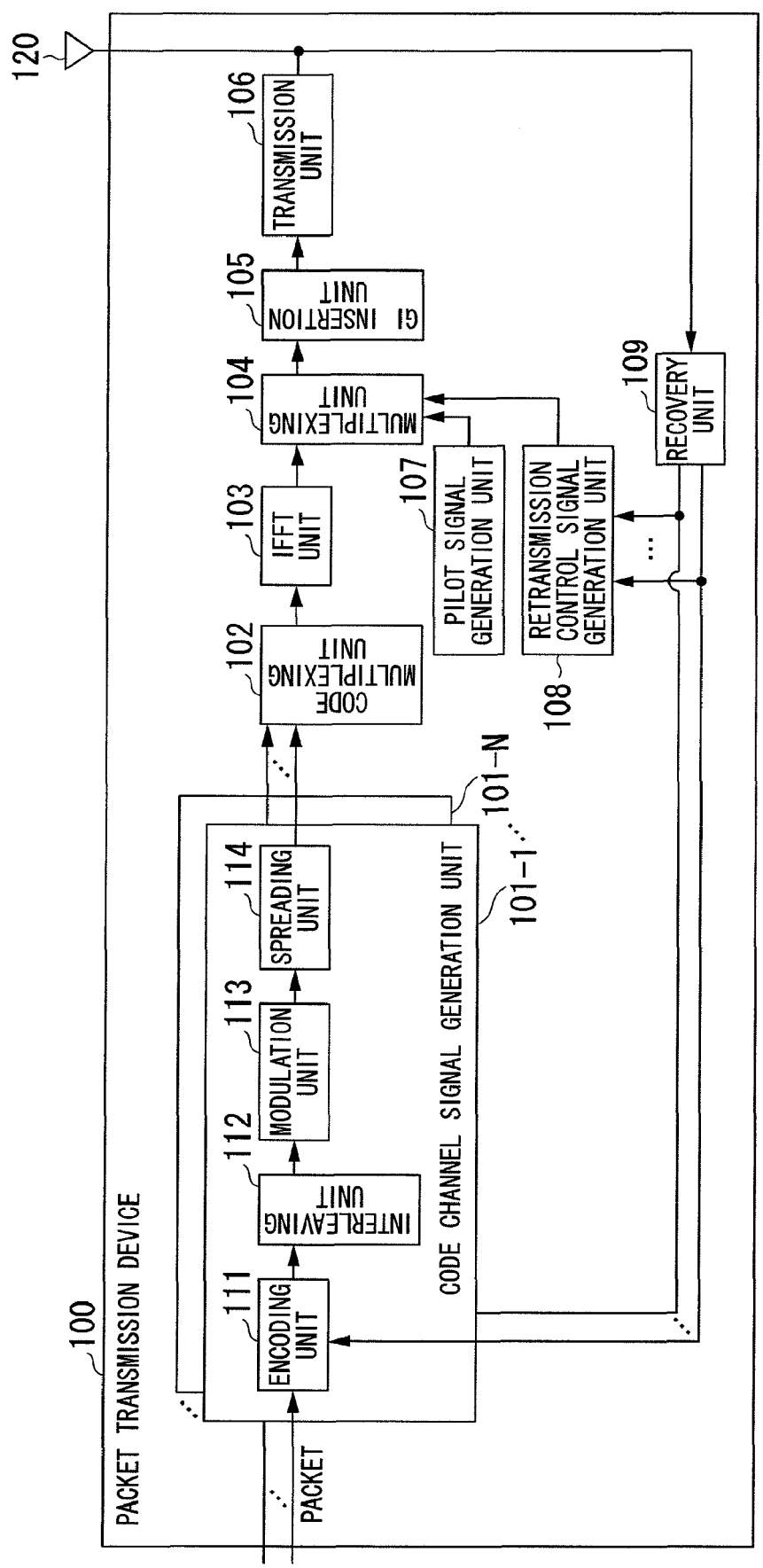
FIG. 1 is a schematic block diagram showing the configuration of a packet transmission device 100 according to a first embodiment of the present invention.

FIG. 1 is a schematic block diagram showing the configuration of the packet transmission device 100 according to an embodiment of the present invention. For example, the packet transmission device 100 is provided in a base station device in downlink by a mobile wireless communication system, and in a mobile station in uplink. Also, the packet transmission device 100 is provided in a relay station device in a downlink between a relay station and the mobile station. The packet transmission device 100 has code channel signal generation units 101-1 to 101-N (where N is the number of code multiplexes), a code multiplexing unit 102, an inverse fast Fourier transform (IFFT) unit 103, a multiplexing unit 104, a guard interval (GI) insertion unit 105, a transmission unit 106, a pilot signal generation unit 107, a retransmission control signal generation unit 108, a recovery unit 109, and an antenna unit 120. The code channel signal generation units 101-1 to 101-N generate code-multiplexed signals from information bit sequences constituting packets of input code channels, and have encoding units 111, interleaving units 112, modulation units 113, and spreading units 114.

FIG. 2 is a schematic block diagram showing the configuration of the encoding unit 111. The encoding unit 111 has a function of adding redundant bits to an information bit sequence constituting the input packet so that the packet reception device 200 can perform error detection and error correction, and has an error detection coding unit 121, an error correction coding unit 122, a coded bit storage unit 123, and a puncturing unit 124. The error detection coding unit 121 performs error detection coding such as cyclic redundancy check (CRC) so that the packet reception device 200 having received a packet can detect whether or not there is an error. The error correction coding unit 122 performs error correction coding, such as a turbo code, a convolutional code, or a low density parity check (LDPC) code, on an output bit sequence from the error detection coding unit 121. In this embodiment, all bits constituting a packet are transmitted in the same code channel, and the error detection coding unit 121 and the error correction coding unit 122 perform processing on each packet.

FIG. 3 is a diagram showing the internal configuration of the error correction coding unit 122 when a turbo code is applied as a coding scheme upon error correction coding at a coding rate $R=\frac{1}{3}$. The error correction coding unit 122 has internal encoders 3001 and 3002 and an internal interleaving unit 3003. If an error detection coded information bit sequence is input from the error detection coding unit 121, the error correction coding unit 122 outputs three types of information bit sequences of systematic bits x, parity bits z, and parity bits z'.

Here, the systematic bits x are a bit sequence itself input from the error detection coding unit 121. The parity bits z are an output result of a coding process performed by the internal encoder 3001 on the bit sequence from the error detection coding unit 121. The parity bits z' are an output result of a coding process performed by the internal encoder 3002 to which an interleaving process result is input after the internal interleaving unit 3003 first performs an interleaving process on the bit sequence from the error detection coding unit 121. Here, the internal encoder 3001 and the internal encoder 3002 may be the same encoder which performs a coding process of the same coding scheme, or may be different encoders. Preferably, both the internal encoder 3001 and the internal encoder 3002 use a recursive convolutional encoder. Hereinafter, the case in which the error correction coding unit 122 uses a turbo code in the configuration shown in FIG. 3 will be described.

The coded bit storage unit 123 stores the coded bit sequence generated by the error correction coding unit 122. If a retransmission packet is generated, the coded bit storage unit 123 outputs the stored coded bit sequence to the puncturing unit 124. The puncturing unit 124 performs a puncturing process on the coded bit sequence output from the error correction coding unit 122 or the coded bit sequence output from the coded bit storage unit 123 according to a puncturing pattern defined on the basis of a response signal (a receipt notification ACK/non-receipt notification NACK) of the packet reception device 200 received by the recovery unit 109 or the number of packet retransmissions calculated from the response signal. That is, if the initial transmission packet is generated (if the receipt notification ACK is received as a response signal to a previous packet), the puncturing unit 124 performs a puncturing process on a new coded bit sequence output from the error correction coding unit 122. If the retransmission packet is generated (if the non-receipt notification NACK is received as the response signal), the puncturing unit 124 performs a puncturing process on the coded bit sequence stored in the coded bit storage unit 123. Also, the puncturing unit 124 may perform rate matching such as bit padding (bit insertion), or bit repetition in addition to the puncturing process.

FIGS. 4 and 5 are diagrams showing examples of puncturing patterns when the error correction coding unit 122 performs turbo coding at a coding rate $R=\frac{1}{3}$ and a puncturing process at a coding rate $R=\frac{3}{4}$. In FIGS. 4 and 5, x is a directly output information bit (also referred to as a systematic bit) as an information bit input to the error correction coding unit 122 by the error detection coding unit 121. z and z' denote two types of redundant bits (parity bits) generated from the above-described information bit. The puncturing unit 124 outputs bits of bit positions having "1" in the puncturing pattern shown in FIG. 4 or 5 among x, z, and z' output from the error correction coding unit 122 or the coded bit storage unit 123.

For example, if IR is applied as HARQ, the puncturing unit 124 performs a puncturing process on coded bits constituting an initial transmission packet according to a pattern 1 of FIG. 4. That is, in the pattern 1 shown in FIG. 4, the puncturing unit 124 outputs all systematic bits since "x=111111," outputs first 1 bit of every 6 bits of a first type of parity bits because "z=100000," and outputs fourth 1 bit of every 6 bits of a second type of parity bits because "z'=000100."

For coded bits constituting a retransmission packet, the puncturing unit 124 calls coded bits of R=⅓ of the initial transmission packet from the coded bit storage unit 123. The puncturing unit 124 outputs a signal having been subjected to a puncturing process performed by a pattern 2 shown in FIG. 4. That is, in the pattern 2 shown in FIG. 4, the puncturing unit 124 outputs no systematic bits because "x=000000," outputs 4 bits including the second to fifth of every 6 of a first type of parity bits because "z=011110," and outputs 4 bits excluding the third and fourth of every 6 of a second type of parity bits because "z'=110011."

Likewise, different puncturing processes may be performed on an initial transmission packet and a retransmission packet using puncturing patterns shown in FIG. 5. FIG. 4 shows the puncturing patterns in which the systematic bits are transmitted only in the initial transmission packet, and FIG. 5 shows the puncturing patterns in which the systematic bits are transmitted in both the initial transmission packet and the retransmission packet, but shows the puncturing patterns in which a ratio of the systematic bits and the parity bits is different between the initial transmission packet (the pattern 1) and the retransmission packet (the pattern 2).

Returning to FIG. 1, the interleaving units 112 rearrange bit arrangements of coded bit sequences as outputs from the encoding units 111. The modulation units 113 perform data modulation such as quadrature phase shift keying (QPSK) or 16 quadrature amplitude modulation (16QAM) for outputs from the interleaving units 112, and generate modulation symbols. The spreading units 114 multiply the modulation symbols generated by the modulation units 113 by spreading code sequences respectively corresponding to the code channel signal generation units 101-1 to 101-N. For example, the spreading code sequence includes an orthogonal code, such as a Walsh-Hadamard code. As described above, the code channel signal generation units 101-1 to 101-N have the above-described functions, and generate code channel signals including an initial transmission packet or a retransmission packet according to a retransmission request from the packet reception device 200.

The code multiplexing unit 102 code-multiplexes output signals from the respective code channel signal generation units 101-1 to 101-N. The IFFT unit 103 performs frequency-to-time conversion by IFFT or the like on a code-multiplexed signal from the code multiplexing unit 102, and generates a time domain signal. When in an input to the IFFT unit 103, an output signal from the code multiplexing unit 102 allocated to a $k^{th}$ subcarrier is defined as S(k), S(k) can be expressed as shown in Expression (1).

[Equation 1]

$$S(k) = \sum_{u=0}^{N-1} c_{u,k \bmod SF} d_u\left(\left\lfloor \frac{k}{SF} \right\rfloor\right) \quad \text{EXPRESSION (1)}$$

where $\lfloor \alpha \rfloor$ Loci is a largest integer less than or equal to $\alpha$.

N denotes the number of code multiplexes in the code multiplexing unit 102, and SF is a spreading factor of a spreading code to be multiplied by the spreading unit 114. $d_u$ denotes a modulation symbol having been subjected to data modulation by the modulation unit 113. k of the $k^{th}$ subcarrier=0, 1, 2, ... $N_{sub}$−1. Here, $N_{sub}$ is the total number of subcarriers.

The multiplexing unit 104 multiplexes the time domain signal output from the IFFT unit 103, a retransmission control signal output from the retransmission control signal generation unit 108, and a pilot signal output from the pilot signal generation unit 107. A multiplexing method in the multiplexing unit 104 may be any one of time multiplexing, frequency multiplexing, code multiplexing, and the like. The pilot signal generation unit 107 generates the pilot signal to be used for channel estimation. The retransmission control signal generation unit 108 generates a signal (the retransmission control signal) for providing the packet reception device 200 with a notification indicating how many times a packet signal transmitted in each code channel is retransmitted. The retransmission control signal generation unit 108 may generate the retransmission control signal including transmission parameters such as a data modulation scheme, a spreading factor, the number of code multiplexes, and a puncturing pattern.

The GI insertion unit 105 inserts a GI into a signal output from the multiplexing unit 104, and inputs the signal to the transmission unit 106. The transmission unit 106 converts the signal output from the GI insertion unit 105 into an analog signal (digital/analog conversion), performs a filtering process of limiting a band, performs conversion into a transmittable frequency band, and outputs the resultant signal. The antenna unit 120 transmits an output signal of the transmission unit 106 to the packet reception device 200. Or, the antenna unit 120 receives a signal including a response signal transmitted from the packet reception device 200.

The recovery unit 109 performs conversion into a frequency band for recovery, a filtering process of limiting a band, conversion of an analog signal into a digital signal (A/D conversion) on the signal from the packet reception device 200 received by the antenna 120, performs reception signal recovery processes such as data demodulation, error correction decoding, and the like on the above-described digital signal, and extracts a response signal included in the signal from the packet reception device 200. The recovery unit 109 outputs the extracted response signal to the retransmission control signal generation unit 108 and the encoding unit 111. On the basis of a transmission scheme of a received signal, the recovery unit 109 has a function of processing and recovering the received signal. The response signal is a transmission acknowledgement signal or a signal including information regarding whether or not retransmission is requested. For example, there is a receipt notification ACK (ACKnowledge)/non-receipt notification NACK (Negative ACKnowledge) signal or the like. If a receiving side has not accurately received a packet transmitted from a transmitting side, the receiving side returns the non-receipt notification NACK signal to the transmitting side. If the receiving side has accurately received the packet, the receiving side returns the receipt notification ACK signal. Also, if the response signal has not been received within a certain predetermined time, it may be determined that the receiving side has not accurately received the packet.

Figure 6:
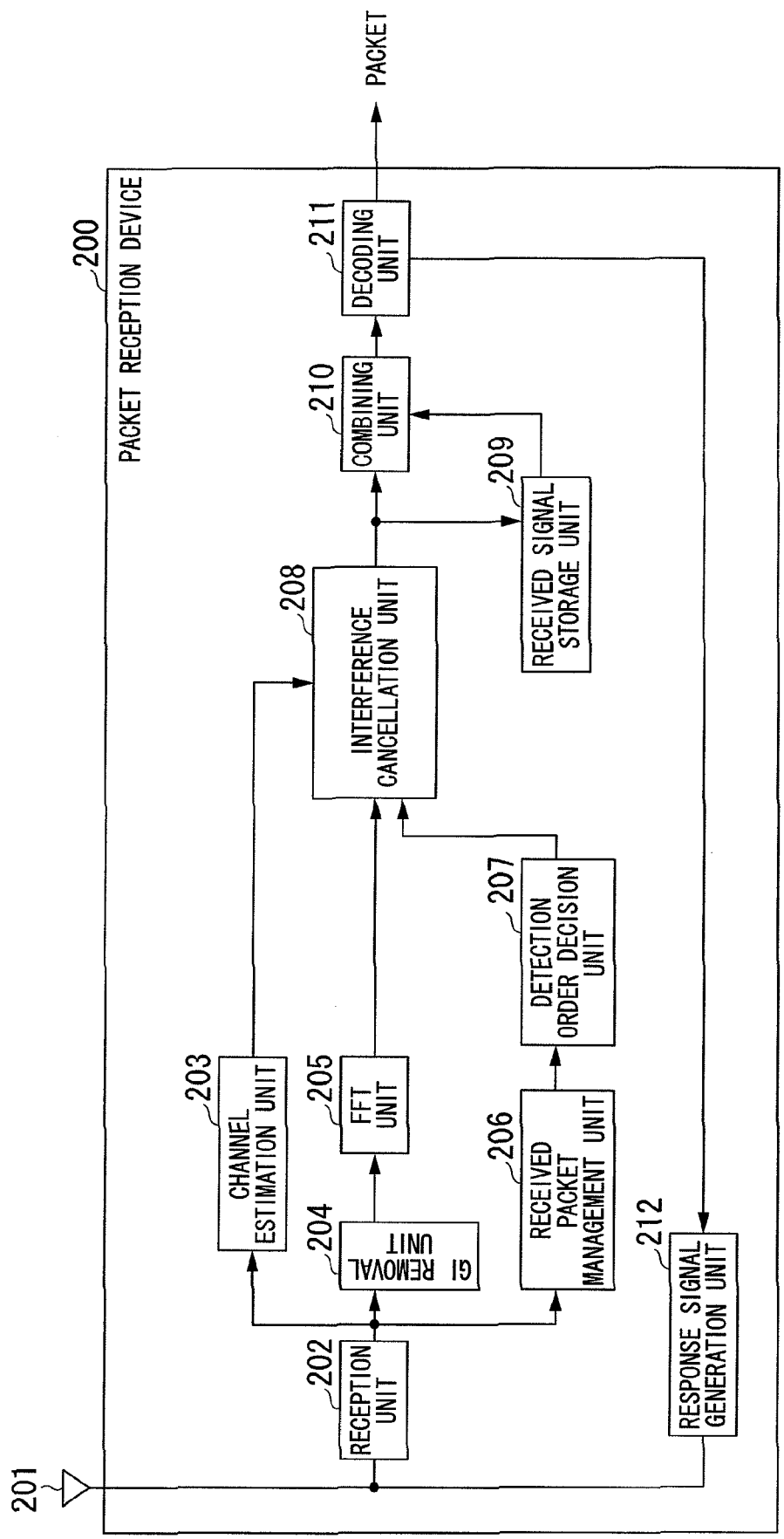
FIG. 6 is a schematic block diagram showing the configuration of a packet reception device 200 according to the same embodiment.

FIG. 6 is a schematic block diagram showing the configuration of the packet reception device 200 according to this embodiment. For example, the packet reception device 200 is provided in a mobile station device in downlink by a mobile wireless communication system, and a base station in uplink. Also, the packet reception device 200 is provided in a relay station device in a downlink between the base station and a relay station. The packet reception device 200 has an antenna unit 201, a reception unit 202, a channel estimation unit 203, a GI removal unit 204, a fast Fourier transform (FFT) unit 205, a received packet management unit 206, a detection order decision unit 207, an interference cancellation unit 208, a received signal storage unit 209, a combining unit 210, a decoding unit 211, and a response signal generation unit 212.

The reception unit 202 performs conversion of a signal from the packet transmission device 100 received from the antenna unit 201 into a frequency band for signal processing, such as a signal detection process, performs a filtering process for band limitation, and then performs conversion from an analog signal to a digital signal (analog/digital conversion). The channel estimation unit 203 estimates a channel (an impulse response, a transfer function, or the like) through which the received signal has passed by using a pilot signal included in the received signal converted into the digital signal by the reception unit 202. Alternatively, another signal such as a control channel, a preamble, or the like by which the channel can be estimated, rather than the pilot signal, may be used.

The received packet management unit 206 extracts information for determining whether a signal of each code channel is an initial transmission packet signal or a retransmission packet signal (specifically, what number retransmission packet a signal is), that is, the number of retransmissions, from the retransmission control signal included in the received signal converted into the digital signal by the reception unit 202. On the basis of information indicating the number of retransmissions, the detection order decision unit 207 decides the order of a code channel from which the interference cancellation unit 208 detects a signal, and notifies the interference cancellation unit 208 of the order. Details of the order decision by the detection order decision unit 207 will be described later.

The GI removal unit 204 removes a GI from a data signal included in the received signal converted into the digital signal by the reception unit 202. The FFT unit 205 converts an output signal of the GI removal unit 204 into a frequency domain signal by performing an FFT process thereon. The interference cancellation unit (signal detection unit) 208 detects an information bit sequence output from the signal output from the FFT while referring to a channel estimation value output from the channel estimation unit 203 on the basis of the detection order decided by the detection order decision unit 207, and also outputs coded bit log likelihood ratios (LLRs) (also referred to as soft decision values) and an error detection result. Details of the operation of the interference cancellation unit will be described later.

Figure 7:
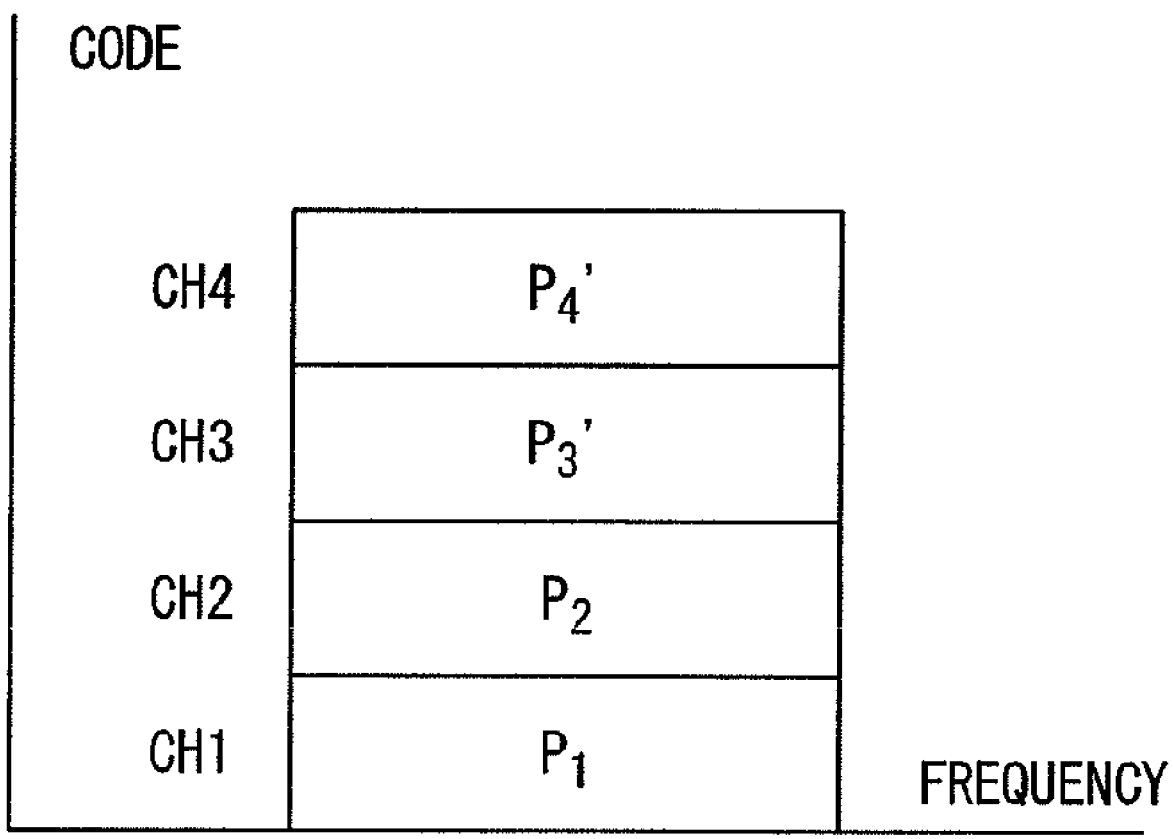
FIG. 7 is a diagram showing an example of code multiplexing according to the same embodiment.

Next, an operation, in which the interference cancellation unit 208 of the packet reception device 200 detects each packet by removing an interference component from a code-multiplexed signal by using a detected signal in the order decided by the detection order decision unit 207 on the basis of the information indicating the number of retransmissions, will be described. Here, it is assumed that each of the code channel signal generation units 101-1 to 101-4 of the packet transmission device 100 generates a signal of one packet among packets $P_1$, $P_2$, $P_3'$, and $P_4'$, and the packet transmission device 100 transmits a signal into which signals of the packets are code-multiplexed as shown in FIG. 7. At this time, the packet transmission device 100 transmits a retransmission control signal indicating the number of retransmissions of the packets $P_1$, $P_2$, $P_3'$, and $P_4'$ along with the packet signals.

It is assumed that the packet $P_1$ is an initial transmission packet (q=0, where q is the number of retransmissions), and is generated by the code channel signal generation unit 101-1 and transmitted using a code channel CH1 multiplied by a spreading code C1. It is assumed that the packet $P_2$ is an initial transmission packet (q=0), and is generated by the code channel signal generation unit 101-2 and transmitted using a code channel CH2 multiplied by a spreading code C2. It is assumed that the packet $P_3'$ is a first retransmission packet (q=1), and is generated by the code channel signal generation unit 101-3 and transmitted using a code channel CH3 multiplied by a spreading code C3. It is assumed that the packet $P_4'$ is a first retransmission packet (q=1), and is generated by the code channel signal generation unit 101-4 and transmitted using a code channel CH4 multiplied by a spreading code C4. It is assumed that the packet $P_3'$ and the packet $P_4'$ are respectively retransmission packets for the initial transmission packets $P_3$ and $P_4$. The puncturing unit 124 of the packet transmission device 100 performs a puncturing process on the initial transmission packets by the pattern 1 shown in FIG. 4 and performs a puncturing process on the retransmission packets by the pattern 2 shown in FIG. 4.

First, the reception unit 202 of the packet reception device 200 receives a signal transmitted by the above-described packet transmission device 100 via the antenna unit 201. The received packet management unit 206 acquires information indicating the number of retransmissions of a packet of each code-multiplexed signal from the retransmission control signal included in the received signal. Here, since the signals of the packets $P_1$, $P_2$, $P_3'$, and $P_4'$ are multiplexed into the received signal as described above, the received packet management unit 206 obtains information indicating that the packets $P_1$ and $P_2$ are $0^{th}$ retransmission (initial transmission packets), the packet $P_3'$ is first retransmission (retransmission packet), and the packet $P_4'$ is first retransmission (retransmission packet). On the basis of the information indicating the number of retransmissions, the detection order decision unit 207 decides a detection order so that detection is performed in order from a code channel including an initial transmission packet of which the number of retransmissions is small. In the case of FIG. 7, the order is decided so that the code channels CH1 and CH2 including the packets $P_1$ and $P_2$ of which the number of retransmissions is 0 are first detected and thereafter the code channels CH3 and CH4 including the retransmission packets $P_3'$ and $P_4'$ are detected.

As described above, the interference cancellation unit 208 preferentially performs a signal detection process on an initial transmission packet, removes an interference replica generated from an initial transmission packet detection signal as a result of the signal detection process, and performs a signal detection process on a retransmission packet. Consequently, when a retransmission packet is detected, a detection process is performed on a signal from which an interference component resulting from an initial transmission packet of which the number of retransmissions is smaller than that of the retransmission packet to be detected is removed, thus improving the detection accuracy of a retransmission signal.

If the number of systematic bits of an initial transmission packet is set to be larger than that of a retransmission packet in a puncturing process upon transmission, the packet having a large number of systematic bits can be accurately detected, so that the packet reception device 200 can accurately detect a signal of the initial transmission packet. It is possible to further improve the detection accuracy of a signal of a retransmission packet by detecting the signal of the retransmission packet after removing an interference replica generated from the detected signal of the initial transmission packet from a received signal.

It is possible to improve the detection accuracy of a packet of which the number of retransmissions is large by performing a detection process from a signal of a packet of which the number of retransmissions is small as in the case in which the puncturing patterns shown in FIG. 4 are used even though a puncturing process is performed on an initial transmission packet by using a pattern 1 shown in FIG. 5 as the puncturing pattern and a puncturing process is performed on a retransmission packet by using a pattern 2 shown in FIG. 5 as the puncturing pattern. Since the number of systematic bits of an initial transmission packet is larger than that of a retransmission packet, it is possible to improve the accuracy of signal detection of a retransmission packet by accurately detecting a signal of the initial transmission packet. Retransmission packets having the same number of retransmissions may be detected in any detection order. For example, all the retransmission packets may be simultaneously detected, and the detection order may be decided using another criterion such as a spreading code sequence.

The spreading unit 114 of the packet transmission device 100 allocates an orthogonal variable spreading factor (OVSF) sequence having a small code generated from the same master code as a spreading code to a packet of which the number of retransmissions is small, so that the packet reception device 200 can accurately detect a signal of the initial transmission packet. It is possible to further improve the detection accuracy of a signal of a retransmission packet by detecting the signal of the retransmission packet after removing an interference replica generated from the detected signal of the initial transmission packet from a received signal.

For example, if spreading is performed by OVSF codes of a spreading factor 4 and the packets $P_2$, $P_3'$, and $P_4'$ are multiplexed with 3 codes, an OVSF code $C_1=(1, 1, 1, 1)$ is allocated to $P_2$, an OVSF code $C_3=(1, -1, 1, -1)$ is allocated to $P_3'$, and an OVSF code $C_4=(1, -1, -1, 1)$ is allocated to $P_4'$. In the OVSF codes, $C_1$ is a code generated from a master code $(1, 1)$, and $C_3$ and $C_4$ are codes generated from a master code $(1, -1)$. The number of codes generated from the same master code of $C_1$ is smaller than the number of codes generated from the same master code of $C_3$ and $C_4$. As the number of codes generated from the same master code is smaller in an OVSF code sequence, higher orthogonality can be maintained. As the number of retransmissions of a packet signal is smaller, the packet signal can be more accurately detected.

The detection order decision unit 207 decides a detection order so that detection is performed in order from a code channel including a packet of which the number of retransmissions is small, such as in order of $P_2$, $P_3'$, and $P_4'$, on the basis of information indicating the number of retransmissions. After the signal detection of an initial transmission packet is first performed, the signal detection is performed on a signal of a retransmission packet of which the number of retransmissions is small, and interference replicas generated using all detected signals are removed from the received signal. Consequently, when a retransmission packet is detected, a detection process is performed on a signal from which interference components by an initial transmission packet and a retransmission packet of which the number of retransmissions is smaller than that of the retransmission packet to be detected are removed, thus improving the detection accuracy of a signal of which the number of retransmissions is large.

Figure 8:
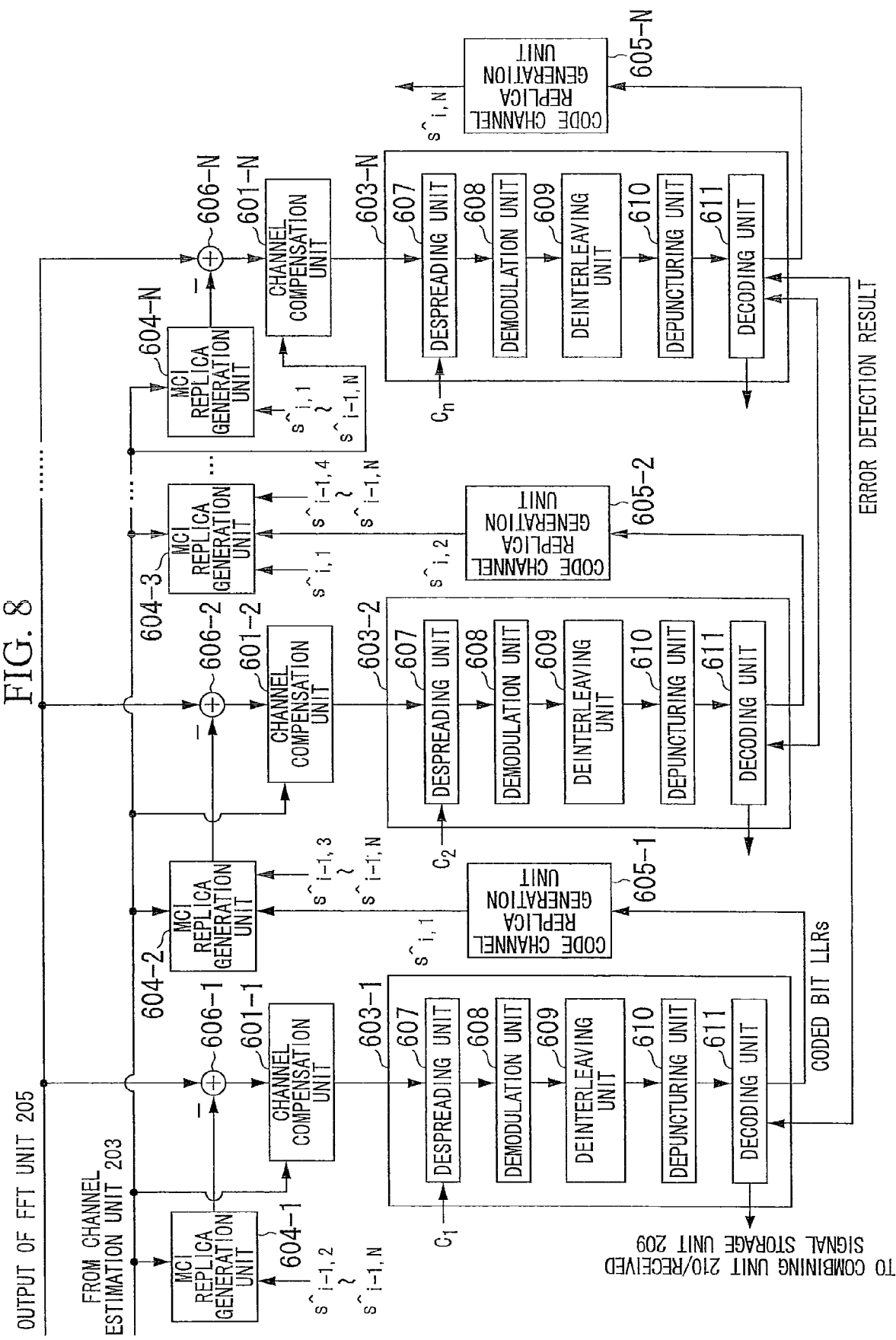
FIG. 8 is a schematic block diagram showing a configuration example of an interference cancellation unit 208 which performs successive iterative interference cancellation according to the same embodiment.

FIG. 8 is a schematic block diagram showing a configuration example of the interference cancellation unit 208 which performs successive iterative interference cancellation. As will be described later, the interference cancellation unit 208 sets a code channel parameter such as a spreading code to each part constituting the interference cancellation unit 208 so that a code channel signal is detected in the order decided by the detection order decision unit 207. The interference cancellation unit 208 has N channel compensation units 601-1 to 601-N, code separation units 603-1 to 603-N, N MCI replica generation units 604-1 to 604-N, code channel replica generation units 605-1 to 605-N, and N subtraction units 606-1 to 606-N. Here, N denotes a maximum value of the number of acceptable code multiplexes. Each of the code separation units 603-1 to 603-N has a despreading unit 607, a demodulation unit 608, a deinterleaving unit 609, a depuncturing unit 610, and a decoding unit 611. A series of processes in the interference cancellation unit 208 is iteratively performed by the predetermined number of iterations. That is, when a signal of the number of code multiplexes, N, is received, the interference cancellation unit 208 performs an iterative process in which a series of processes of performing interference cancellation by the subtraction unit 606-1 to 606-N, channel compensation by the channel compensation unit 601-1 to 601-N, and code channel separation by any one of the code separation units 603-1 to 603-N for first to $N^{th}$ code channels is repeated by the number of iterations.

On the basis of the order decided by the detection order decision unit 207, the interference cancellation unit 208 sets a parameter of each configuration part. In FIG. 8, in order of code channels CH1, CH2, CH3, and CH4 (order of packets $P_1$, $P_2$, $P_3'$, and $P_4'$) decided by the detection order decision unit 207 on the basis of the example shown in FIG. 7 when N=4, signals of code channels (packets) are detected, and interferences are removed therefrom. Details of each part of the interference cancellation unit 208 will be described later.

Figure 10:
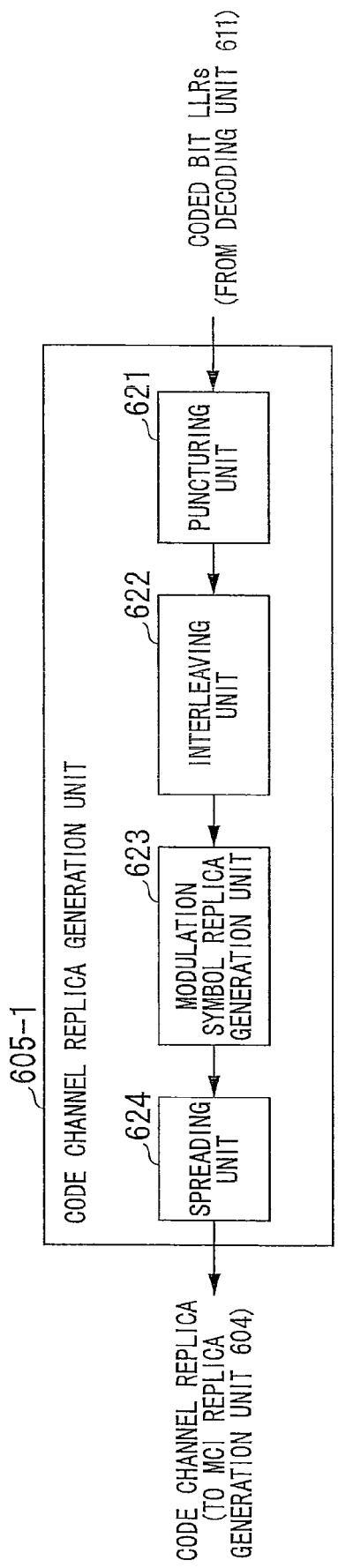
FIG. 10 is a schematic block diagram showing the configuration of a code channel replica generation unit 605-1 according to the same embodiment.

FIG. 10 is a schematic block diagram showing the configuration of the code channel replica generation unit 605-1. The code channel replica generation units 605-2 to 605-N have the same configuration as the code channel replica generation unit 605-1 as described below. The code channel replica generation unit 605-1 has a puncturing unit 621, an interleaving unit 622, a modulation replica generation unit 623, and a spreading unit 624, and generates a replica of a code channel corresponding to a spreading code input to the spreading unit 624 among spreading codes $C_1 \ldots C_N$ on the basis of the detection order decided by the detection order decision unit 207. That is, the code channel replica generation unit 605-1 generates a code channel replica on the basis of coded bit LLRs outputted every time the code separation unit 603-1 shown in FIG. 8 detects a signal of a code channel corresponding to a spreading code input to the despreading unit 607 among the spreading codes $C_1$ to $C_N$. Likewise, the code channel replica generation units 605-2 to 605-N respectively generate code channel replicas on the basis of coded bit LLRs outputted by the code separation units 603-2 to 603-N. Here, the coded bit LLR is an LLR of each bit coded by the encoding unit 111 using an error correction code.

The puncturing unit 621 performs a puncturing process on LLRs of coded bits as an output signal from the decoding unit 611 by using the same pattern as a puncturing pattern applied by the puncturing unit 124 of the packet transmission device 100 as a packet transmission source for each code channel (packet). The interleaving unit 622 performs a process of rearranging the bit arrangement of an output signal from the puncturing unit 621 by using the same pattern as an interleaving pattern applied by the interleaving unit 112 of the packet transmission device 100 for each code channel (packet).

The modulation symbol replica generation unit 623 generates a modulation symbol replica by modulating an output signal from the interleaving unit 622 in the same modulation scheme as that of the modulation unit 113 such as QPSK modulation, 16QAM modulation, or the like. The process of the modulation symbol replica generation unit 623 will be described using an example of QPSK modulation. If LLRs of bits constituting a QPSK modulation symbol are $\lambda(b_0)$ and $\lambda(b_1)$, a replica of the QPSK modulation symbol is given by Expression (2).

Here, j denotes an imaginary unit. It is possible to generate a symbol replica in the same theory even in another modulation scheme such as 16QAM.

[Equation 2]

$$\frac{1}{\sqrt{2}}\tanh(\lambda(b_0)/2) + \frac{j}{\sqrt{2}}\tanh(\lambda(b_1)/2) \quad \text{EXPRESSION (2)}$$

The spreading unit 624 replicates the modulation symbol replica output from the modulation symbol replica generation unit 623 by a spreading factor of the spreading codes $C_1 \ldots C_N$, performs multiplication of the spreading codes $C_1 \ldots C_N$ in code channels, and generates code channel replicas (data signal replicas).

Next, operations of the MCI replica generation units 604-1 to 604-N and the code separation units 603-1 to 603-N when code channel detection and interference cancellation are performed in order of the code channels CH1, CH2, CH3, and CH4 will be sequentially described with reference to FIG. 8.

First, if the code separation unit 603-1 detects a signal of the first detected code channel CH1 in an $i^{th}$ iteration of the iterative process in the interference cancellation unit 208, the MCI replica generation unit (interference replica generation unit) 604-1 generates an MCI replica as a replica of a component serving as interference to the code channel CH1 by code-multiplexing replica signals $\hat{S}_{i-1, 2}$ to $\hat{S}_{i-1, 4}$ of the code channels CH2 to CH4 generated by the code channel replica generation units 605-2 to 605-N in an $i-1^{th}$ iteration and further performing multiplication of channel estimation values calculated by the channel estimation unit 203. Here, a replica signal $\hat{S}_{a, b}$ is a replica signal of a code channel having the $b^{th}$ detection order generated in an $a^{th}$ iteration of the iterative process. Since the $i-1^{th}$ iteration is absent when $i=1$ upon the first iterative process, processing is performed by setting a corresponding value to be absent (referred to as "0"). Next, the subtraction unit 606-1 subtracts an MCI replica for the code channel CH1 generated by the MCI replica generation unit 604-1 from an output signal from the FFT unit 205.

The channel compensation unit 601-1 multiplies a subtraction result of the subtraction unit 606-1 by a weight coefficient for compensating for channel distortion calculated using a channel estimation value calculated by the channel estimation unit 203.

Here, a minimum mean square error (MMSE) weight, an orthogonal restoration combining (ORC) weight, a maximum ratio combining (MRC) weight, or the like may be used as the weight coefficient. Next, the despreading unit 607 of the code separation unit 603-1 performs a despreading process by multiplying the output signal from the channel compensation unit 601-1 by a spreading code C1 unique to the code channel CH1, and detects a signal of the code channel CH1. Thereafter, the demodulation unit 608 performs a demodulation process on an output signal from the despreading unit 607 in the same modulation scheme as that of the transmitting side such as QPSK, 16QAM, or the like, and calculates a soft decision result of coded bits, for example, coded bit LLRs.

A demodulation process of the demodulation unit 608 will be described as an example in which a modulation scheme is QPSK and coded bit LLRs are calculated as a soft decision result. A QPSK symbol transmitted at the transmitting side, that is, a modulation result by the modulation unit 113 shown in FIG. 1, is described as X and a symbol after despreading at the receiving side, that is, a result of despreading by the despreading unit 607, is described as Xc. When bits constituting X are $b_0$ and $b_1$ ($b_0$, $b_1 = \pm 1$), X may be expressed by the following Expression (3). Here, j denotes an imaginary unit.

$\lambda(b_0)$ and $\lambda(b_1)$ as LLRs of the bits $b_0$ and $b_1$ are calculated from an estimation value Xc at the receiving side of X as in the following Expression (4).

[Equations 3]

$$X = \frac{1}{\sqrt{2}}(b_0 + jb_1) \quad \text{EXPRESSION (3)}$$

$$\lambda(b_0) = \frac{2\text{Re}(X_c)}{\sqrt{2}\,(1-\mu)} \quad \text{EXPRESSION (4)}$$

Here, Re( ) indicates a real part of a complex number. μ is an equivalent amplitude after channel compensation. For example, if a channel estimation value in a $k^{th}$ subcarrier is H(k) and a multiplied channel compensation weight of an MMSE criterion is W(k), μ is W(k)H(k). It is preferable that $\lambda(b_1)$ be produced by replacing a real part and an imaginary part of $\lambda(b_0)$. It can be produced on the basis of the same theory even in another modulation scheme such as 16QAM, rather than QPSK. The demodulation unit 608 may produce a hard decision result, not a soft decision result.

Next, the deinterleaving unit 609 rearranges the bit arrangement for coded bit LLRs outputted by the demodulation unit 608 in an inverse operation to the interleaving operation performed by the interleaving unit 112 of the packet transmission device 100 of a transmission source. The depuncturing unit 610 performs a depuncturing process on coded bit LLRs of which bit arrangement has been rearranged by the deinterleaving unit 609 by using a puncturing pattern for an initial transmission packet, and outputs a result of the depuncturing process to the decoding unit 611.

The operation of the depuncturing unit 610 will be described in detail. First, it is assumed that a coded bit sequence outputted by the error correction coding unit 122 of the packet transmission device 100 is "x1, z1, z1', x2, z2, z2', x3, z3, z3', x4, z4, z4', x5, z5, z5', x6, z6, and z6'" and the puncturing unit 124 performs a puncturing process of puncturing bits by the pattern 1 shown in FIG. 4 and outputs a coded bit sequence "x1, z1, x2, x3, x4, z4', x5, and x6." It is assumed that coded bit LLRs as an output of the deinterleaving unit 609 corresponding to a coded bit sequence outputted by the puncturing unit 124 transmitted by the packet transmission device 100 are "$x_r1, x_41, x_r2, x_r3, x_r4, z_r4', x_r5$, and $x_r6$."

At this time, the depuncturing unit 610 inserts virtual values into bit positions corresponding to z1', z2, z2', z3, z3', z4, z5, z5', z6, and z6' punctured by the puncturing unit 124 of the transmission source to the coded bit LLRs "$x_r1, z_r1, x_r2, x_r3, x_r4, z_r4', x_r5$, and $x_r6$." If an intermediate value of the LLR, "0," is used as a virtual value, coded bit LLRs outputted by the depuncturing unit 610 become "$x_r1, x_41, 0, x_r2, 0, 0, x_r3, 0, 0, x_r4, 0, z_r4', x_r5, 0, 0, x_r6, 0$, and 0."

Next, the decoding unit 611 performs an error correction decoding process corresponding to turbo coding, convolutional coding, or the like performed by the error correction coding unit 122 of the packet transmission device 100 of the transmission source on coded bit LLRs outputted by the depuncturing unit 610, and outputs error-corrected coded bit LLRs. Here, since the code separation unit 603-1 separates the code channel CH1, the code channel replica generation unit 605-1 generates a replica signal of the code channel CH1 by using coded bit LLRs of the code channel CH1 from the decoding unit 611 of the code separation unit 603-1.

The decoding unit 611 performs an error detection process on a packet by an error detection code of CRC or the like applied by the error correction coding unit 122 of the packet transmission device 100 of the transmission source. A result of the error detection process is input to the decoding unit 611 of the code separation unit 603-N which detects a signal of the last code channel. When no error exists in all error detection process results of the decoding units 611 or when the number of iterations of the iterative process counted by the decoding units 611 reaches the predetermined number of iterations (the maximum number of times), the decoding unit 611 of the code separation unit 603-N receiving the input ends the iterative process (stops an output to the code channel replica generation unit 605-N), and outputs coded bit LLRs of the error correction decoding result by the decoding unit 611 to the combining unit 210 and the received signal storage unit 209.

Figure 9:
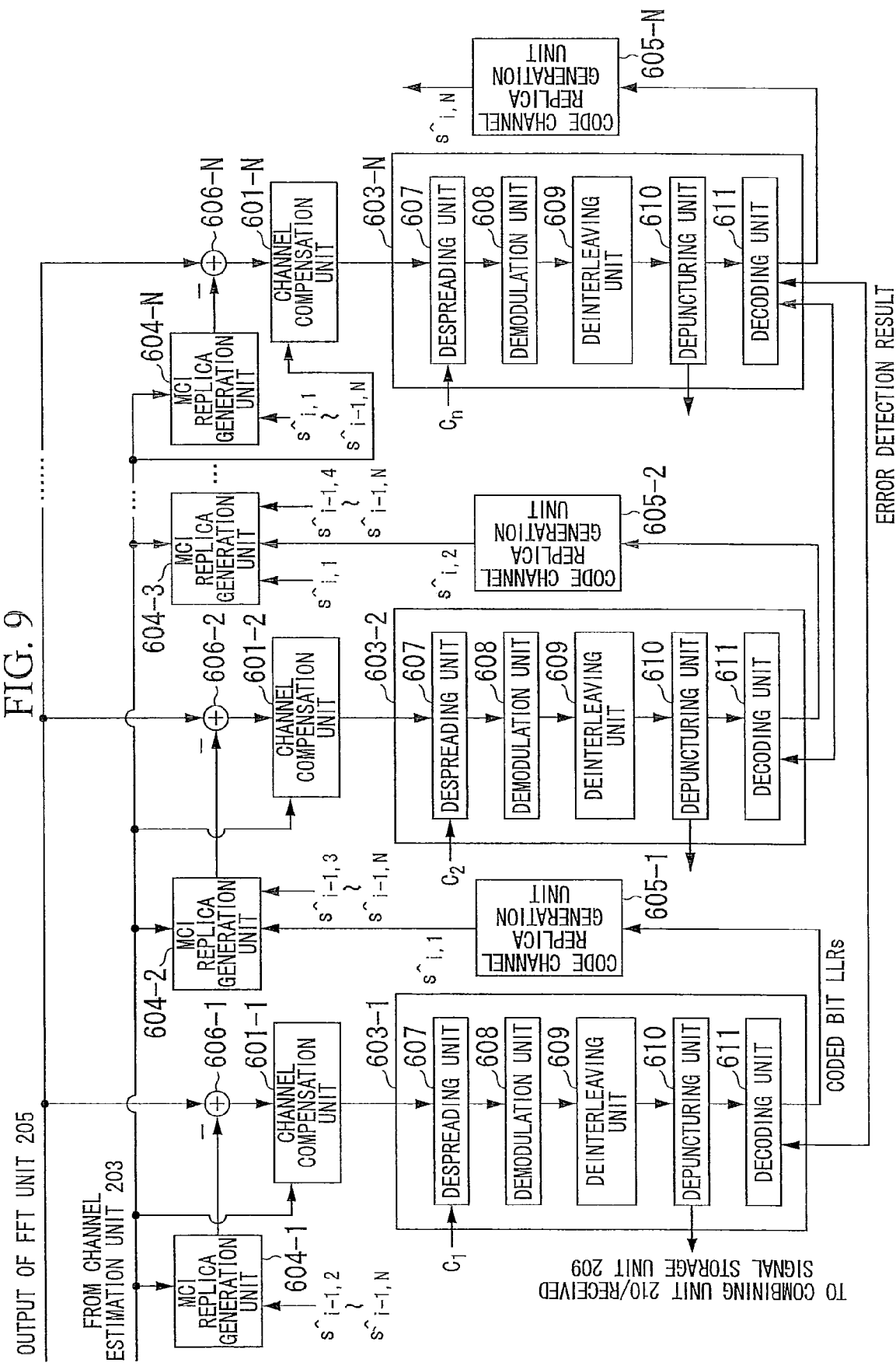
FIG. 9 is a schematic block diagram showing a modified example of the configuration of the interference cancellation unit 208 according to the same embodiment.

Here, as shown in FIG. 9, as a signal to be outputted to the combining unit 210 and the received signal storage unit 209, an output signal of the depuncturing unit 610 instead of the decoding unit 611 may be inputted to the combining unit 210 and the received signal storage unit 209.

As described above, the interference cancellation unit 208 detects a signal of the code channel CH1 according to the order decided by the detection order decision unit 207, and detects signals in order of the code channels CH2, CH3, and CH4 using a replica of the code channel of which a signal is previously detected.

As described below, code channel replicas inputted to the MCI replica generation units 604-1 to 604-N are different between an MCI replica generation process for the code channels CH2, CH3, and CH4 and an MCI replica generation process for the code channel CH1.

If the code separation unit 603-2 detects a signal of the code channel CH2 in the $i_{th}$ iteration of the iterative process in the interference cancellation unit 208, the MCI replica generation unit 604-2 generates an MCI replica serving as interference to the code channel CH2 by code-multiplexing a replica signal $\hat{S}_{i,1}$ of the code channel CH1 generated in the $i^{th}$ iteration with replica signals $\hat{S}_{i-1,3}$ and $\hat{S}_{i-1,4}$ of the code channels CH3 and CH4 generated in the $i-1^{th}$ iteration and thereby further multiplying a channel estimation value.

Likewise, if the code separation unit 603-3 detects a signal of the code channel CH3, the MCI replica generation unit 604-3 generates an MCI replica serving as interference to the code channel CH3 by code-multiplexing replica signals $\hat{S}_{i,1}$ and $\hat{S}_{i,2}$ of the code channels CH1 and CH2 generated in the $i^{th}$ iteration with a replica signal $\hat{S}_{i-1,4}$ of the code channel CH4 generated in the $i-1^{th}$ iteration and thereby further multiplying a channel estimation value. If the code separation unit 603-4 detects a signal of the code channel CH4, the MCI replica generation unit 604-4 generates an MCI replica serving as interference to the code channel CH4 by code-multiplexing replica signals $\hat{S}_{i,1}$ to $\hat{S}_{i,3}$ of the code channels CH1 to CH3 generated in the $i^{th}$ iteration and thereby further multiplying a channel estimation value.

As described above, every time signal detection of any one code channel corresponding to the code channels CH1 to CH4 ends on the basis of the detection order by the detection order decision unit 207, a code channel replica generation unit corresponding to a code channel from which a signal is detected generates (updates) a code channel replica, and the MCI replica generation unit 604-1 to 604-N generates an MCI replica to be used in an interference cancellation process for a code channel to be detected the next time by using the generated (updated) code channel replica. In the $i^{th}$ iteration, the MCI replica generation unit 604-1 to 604-N calculates an MCI replica $\hat{R}_{i,u}$ to be used for the interference cancellation process upon detection of a $u^{th}$ code channel as the $u^{th}$ in the detection order by the detection order decision unit 207 by the following Expression (5).

[Equation 4]

$$\hat{R}_{i,u} = H\left(\sum_{n=1}^{u-1} \hat{S}_{i,n} + \sum_{n=u+1}^{N} \hat{S}_{i-1,n}\right) \qquad \text{EXPRESSION (5)}$$

Here, H is a channel estimation value and N is the number of multiplexed code channels. Since the $i-1^{th}$ code channel replica $\hat{S}_{i-1,n} = \hat{S}_{0,n}$ cannot be generated when i=1 in the above-described interference cancellation unit 208 as the successive iterative interference canceller, an MCI replica is generated only by a code channel replica capable of being generated when i=1.

The interference cancellation unit 208 generates a code channel replica using coded bit LLRs outputted from the decoding unit 611, but may generate a code channel replica using coded bit LLRs outputted from the depuncturing unit 610.

The deinterleaving unit 609 and the depuncturing unit 610 perform processing according to a pattern corresponding to each code channel. The despreading unit 607 performs multiplication of a spreading code sequence multiplied upon transmission unique to each code channel.

The case in which interference cancellation (code channel signal detection) is sequentially performed for code channels one by one on the basis of the number of retransmissions of packets constituting code channels has been described in this embodiment, but interference cancellation may be sequentially performed for each group by grouping code channels on the basis of the number of retransmissions of packets. For example, there is the case in which grouping is performed by whether a code channel is an initial transmission packer or a retransmission packet. When the above-described grouping is performed, an interference replica is generated using an initial transmission packet signal among detected signals if retransmission packet signals are detected and an interference component is removed.

When the iterative process in the interference cancellation unit 208 reaches the predetermined number of iterations (for example, the maximum number of times), the received signal storage unit 209 shown in FIG. 6 stores coded bit LLRs (decoding results) outputted by the decoding units 611 or coded bit LLRs (demodulation results) outputted by the depuncturing units 610. If coded bit LLRs for a retransmission packet from the interference cancellation unit 208 are outputted, the received signal storage unit 209 outputs coded bit LLRs for a packet received before the retransmission packet, that is, an initial transmission packet for at least one of the retransmission packet and a retransmission packet for the initial transmission packet, to the combining unit 210. For example, when a retransmission packet of a $p^{th}$ time is received, coded bit LLRs of a received packet (initial transmission packet) of a first time may be outputted, and coded bit LLRs of received packets of first to $p-1^{th}$ times may be outputted.

The combining unit 210 combines coded bit LLRs outputted by the reception signal storage unit 209 with coded bit LLRs of the retransmission packet outputted by the interference cancellation unit 208. That is, the combining unit 210 combines the coded bit LLRs outputted by the interference cancellation unit 208 with coded bit LLRs of a signal of an initial transmission packet of coded bit LLRs outputted by the interference cancellation unit 208, or coded bit LLRs of a retransmission packet for the initial transmission packet, among coded bit LLRs stored in the reception signal storage unit 209. Among outputs of the interference cancellation unit 208, the combining unit 210 directly outputs the coded bit LLRs of the initial transmission packet. For example, if the output signal of the received signal storage unit 209 for the code channel CH3 is $g1_p(m)$ (where m is an index of a coded bit constituting a packet and a maximum value thereof is the number of bits constituting the packet) and the output signal for the code channel CH3 from the interference cancellation unit 208 is $g2_p(m)$ in the case in which coded bit LLRs for the code channel CH3 outputted by the interference cancellation unit 208 are a signal of the retransmission packet of the $p^{th}$ time, the combining unit 210 calculates an output signal $\lambda_p$ by the following Expression (6) when the retransmission packet signal of the $p^{th}$ time is received.

[Equation 5]

$$\lambda_p = \alpha_p g1_p(m) + \beta_p g2p(m) \qquad \text{EXPRESSION (6)}$$

$\alpha_p$ denotes a weight coefficient assigned to the output $g1_p(m)$ from the received signal storage unit 209, and $\beta_p$ denotes a weight coefficient assigned to the output $g2_p(m)$ from the interference cancellation unit 208, wherein $\alpha_p$ and $\beta_p$ are decided by multi-level numbers of data modulation performed for $g1_p(m)$ and $g2_p(m)$, coding rates, spreading factors, the number of code multiplexes, or the like. For example, if $g1_p(m)$ is set to be QPSK modulated and $g2_p(m)$ is set to be 16QAM modulated, combination reflecting demodulation accuracy is possible by assigning weights so that $\alpha_p > \beta_p$. However, the combination may also be performed by setting $\Delta_p \beta_p = 1$.

The decoding unit 211 performs an error correction decoding process to error correction coding such as turbo coding, convolutional coding, or the like performed by the packet transmission device 100 of the transmission source for an output signal (coded bit LLRs) from the combining unit 210, and generates an error detection coded bit sequence. Also, the decoding unit 211 performs an error detection process on a packet by error detection of CRC or the like applied by a transmission source device in the error detection coded bit sequence, and outputs an error detection result. Also, the decoding unit 211 outputs a packet including an information bit sequence excluding redundant bits for detecting an error from the generated bit sequence if no error is detected in the error detection process.

The response signal generation unit 212 generates a response signal by generating a data sequence including control data indicating the presence/absence of a packet error from the error detection result received from the decoding unit 211 and performing signal processing such as error correction coding, data modulation, and the like. Also, the response signal generation unit 212 converts the response signal into an analog signal (D/A conversion), and further performs conversion into a transmittable frequency band (radio frequency band). The response signal generation unit 212 transmits a signal including the response signal from the antenna 201.

As long as a transmission signal of the transmission source of a received signal is recoverable, OFDM, a single-carrier modulation scheme, or the like may be used as a communication scheme of the response signal by the response signal generation unit 212. If a signal indicating "absence of packet error" is inputted from the decoding unit 211, the response signal generation unit 212 generates an ACK signal as a response signal indicating that reception is accurately completed, which is to be transmitted to a transmission/reception device of the transmission source of the received signal. If a signal indicating "presence of packet error" is inputted from the decoding unit, the response signal generation unit 212 generates a NACK signal as a response signal for a packet retransmission request, which is to be transmitted to the transmission/reception device of the transmission source of the received signal.

The decoding unit 611 may be used in place of the above-described decoding unit 211.

Figure 11:
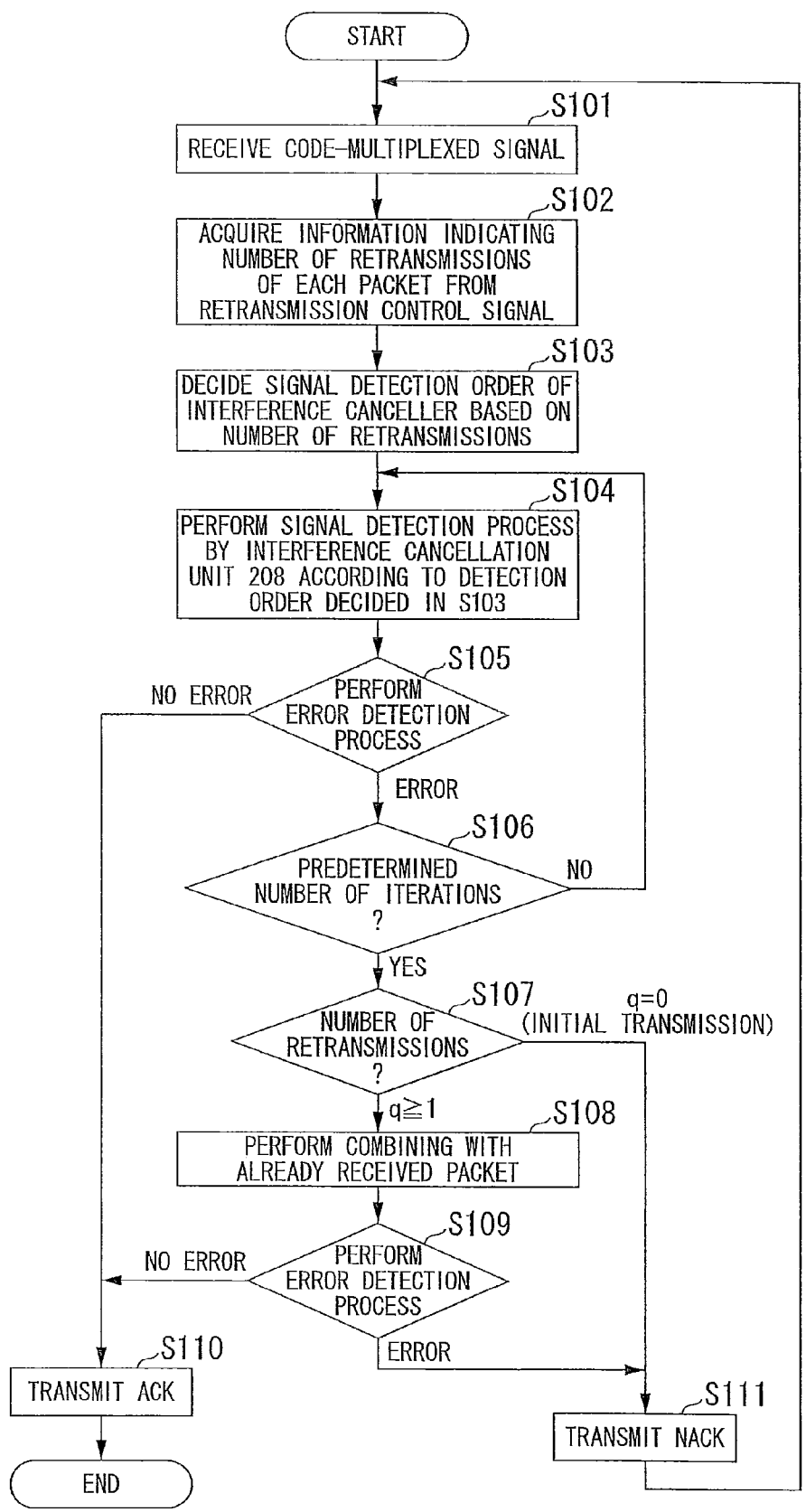
FIG. 11 is a flowchart illustrating the operation of a packet reception device 200 according to the same embodiment.

FIG. 11 is a flowchart illustrating the operation of the packet reception device 200. If the packet reception device 200 receives a code-multiplexed signal (S101), the received packet management unit 206 of the packet reception device 200 acquires information indicating the number of retransmissions of a packet constituting each code channel from a retransmission control signal included in a received signal (S102). The detection order decision unit 207 decides a signal detection order (signal removal order) of a packet (code channel) from which a signal is detected by cancelling interference from the information indicating the number of retransmissions acquired by the received packet management unit 206 (S103).

According to the order of signal detection decided in step S103, the interference cancellation unit 208 detects a packet (code channel) (S104). Each decoding unit 611 determines whether or not an error exists in a packet from which a signal is detected (S105). If it is determined that no error exists in all packets, the response signal generation unit 212 returns a response signal indicating that no error exists to the packet transmission device 100 (S110). If it is determined that an error exists in the packet in step S105, the decoding unit 611 determines whether or not the iterative process of the interference cancellation unit 208 has been repeated by the number of iterations (S106). If it is determined that the iterative process has not been repeated by the number of iterations, the decoding unit 611 outputs coded bit LLRs and the interference cancellation unit 208 performs the iteration once again by returning to step S104.

On the other hand, if it is determined in step S106 that the iterative process has been repeated by the number of iterations, the response signal generation unit 212 determines the number of retransmissions of a packet constituting a code channel from which an error is detected in step S105 (S107). When it is determined to be an initial transmission packet (q=0), a response signal indicating a retransmission request is returned to the transmission source (S111). When it is determined to be a retransmission packet (q≧1) in step S107, the combining unit 210 combines coded bit LLRs of the retransmission packet outputted by the decoding unit 611 with a previously received initial transmission packet stored by the received signal storage unit 209 (S108) and the decoding unit 211 performs an error detection process for a combining result (S109). If an error is absent as a result of the error detection process, the response signal indicating that the error is absent is returned to the transmission source (S110). If an error is present, the response signal indicating the retransmission request is returned to the transmission source (S111) and the next signal is received by returning to step S101.

An example in which the interference cancellation unit 208 performs an iterative process of iterating signal detection from code-multiplexed code channels has been described in this embodiment, but only processing of the first time in the above-described iterative process, that is, the detection of a signal of each code channel, may be performed for each code channel once without iteration.

In this embodiment as described above, the detection order decision unit 207 of the packet reception device 200 decides the order of signal detection so that detection is performed from a packet of which the number of transmissions is small among code-multiplexed packets, and the interference cancellation unit 208 detects a signal of a retransmission packet after detecting a signal from an initial transmission packet in order according to the signal detection order and removing an interference component resulting from a signal of a packet from which the signal is detected from a received signal. Thus, when the signal detection is performed on a retransmission packet, the signal detection is performed on a signal from which more interference components are removed, thereby performing the signal detection with high accuracy. Accordingly, delay can be prevented from being increased due to the number of retransmissions of a specific packet being increased.

The puncturing unit 124 of the packet transmission device 100 performs a puncturing process using a puncturing pattern including a larger number of systematic bits of an initial transmission packet than those of a retransmission packet. Accordingly, since the initial transmission packet detected more preferentially than the retransmission packet includes a larger number of systematic bits, the interference cancellation unit 208 of the packet reception device 200 can accurately detect a signal of the initial transmission packet, the accuracy of removing an interference component for a signal of the retransmission packet on the basis of the signal of the initial transmission packet can be improved, and the signal detection of the retransmission packet can be accurately performed.

Second Embodiment

In the first embodiment, the case in which an initial transmission packet and a retransmission packet of HARQ are code-multiplexed by spreading codes and MCI is removed by an SIC has been described. In the second embodiment, a communication system in which an initial transmission packet and a retransmission packet transmitted by a packet transmission device 300 are spatially multiplexed using multi-input multi-output (MIMO) in a communication system having the packet transmission device 300 and a packet reception device 400, and the packet reception device 400 removes another stream signal by the SIC will be described. In this embodiment, the case in which an OFDM scheme is applied as a packet transmission scheme will be described.

Here, the interference signal means another signal spatially multiplexed. That is, for example, if signals $P_1$ and $P_2$ are spatially multiplexed, the signal $P_2$ is an interference signal to the signal $P_1$ and the signal $P_1$ is an interference signal to the signal $P_2$. An interference cancellation process is a process of removing a signal (replica) generated by reproducing an interference signal from a received signal. For example, when the signal $P_2$ is detected, a signal obtained by removing a replica of the signal $P_1$ from the received signal is used.

Figure 12:
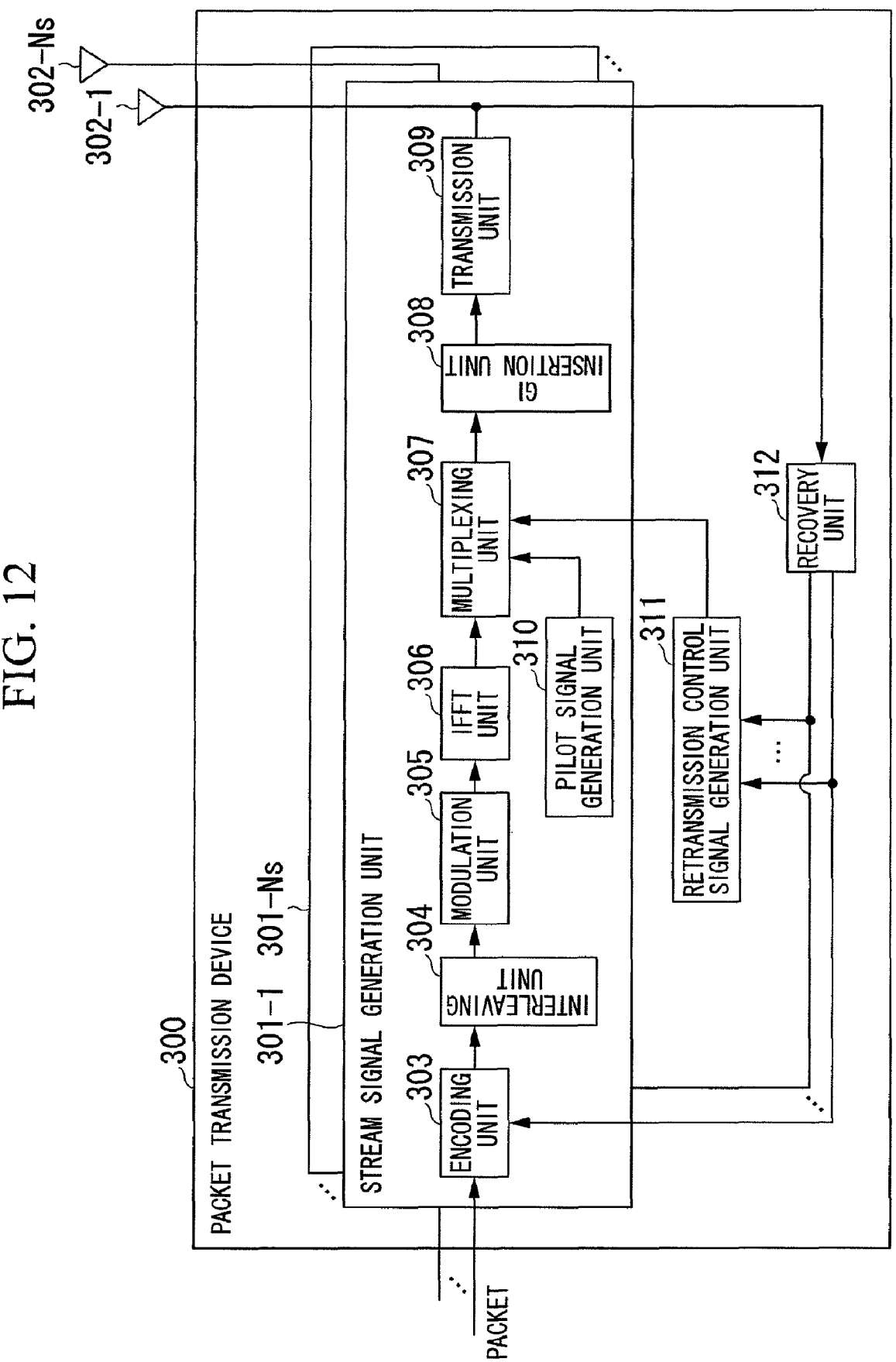
FIG. 12 is a schematic block diagram showing the configuration of a packet transmission device 300 according to a second embodiment of the present invention.

FIG. 12 is a schematic block diagram showing the configuration of the packet transmission device 300 according to this embodiment. For example, the packet transmission device 300 is provided in a base station in downlink by a wireless communication system, and a mobile station in uplink. Also, the packet transmission device 300 is provided in a relay station in the downlink between the relay station and the mobile station.

The packet transmission device 300 has stream signal generation units 301-1 to 301-Ns (where Ns is the number of streams), antenna units 302-1 to 302-Ns, a retransmission control signal generation unit 311, and a recovery unit 312, and transmits N stream signals generated from other information bit sequences constituting packets one by one from the antenna unit 302-1 to 302-Ns.

Also, the packet transmission device 300 recovers a signal including a response signal from the packet reception device 400.

The recovery unit 312 converts a signal received by the packet reception device 400 via the antenna unit 302-1 into a frequency band in which a recovery process is possible, performs band limitation by a filtering process, performs conversion from an analog signal into a digital signal (A/D conversion), performs a received signal recovery process of data demodulation, error correction decoding, and the like on the digital signal, extracts a response signal included in a signal from the packet reception device 400, and notifies encoding units 303 and retransmission control signal generation units 311 included in the stream generation units 301-1 to 301-Ns of packet reception success/failure information indicated by the response signal. Also, the recovery unit 312 has a function of processing and recovering a received signal on the basis of a transmission scheme of the received signal. Here, the case in which the recovery unit 312 performs reception via the antenna unit 302-1 has been described, but reception may be performed via any one of the antenna units 302-2 to 302-Ns, and may be performed from another dedicated antenna.

Each of the stream signal generation units 301-1 to 301-Ns generates a stream-specific transmission data signal from information bits constituting an input packet, and has an encoding unit 303, an interleaving unit 304, a modulation unit 305, an IFFT unit 306, a pilot signal generation unit 310, a multiplexing unit 307, a GI insertion unit 308, and a transmission unit 309.

The encoding unit 303 has a function of adding redundant bits to an information bit sequence of an input packet so that the packet reception device 400 can perform error detection and error correction, and has an error detection coding unit 121, an error correction coding unit 122, a coded bit storage unit 123, and a puncturing unit 124 as in the encoding unit 111 of the first embodiment shown in FIG. 2. Encoding units 303 output coded bits of initial transmission packets or coded bits of retransmission packets according to response signals from the packet reception device 400 to stream signals (packet signals) outputted by the stream signal generation units 301-1 to 301-Ns. In this embodiment, a packet is generated for each stream, and error detection coding and error correction coding are performed on each packet (each stream). The puncturing unit 124 may use the puncturing patterns shown in FIG. 4, and may use the puncturing patterns shown in FIG. 5, as in the first embodiment.

The interleaving unit 304 rearranges the bit arrangement of coded bits outputted by the encoding unit 303 according to a predetermined pattern. The modulation unit 305 performs data modulation by QPSK, 16QAM, or the like on the coded bits of the bit arrangement rearranged by the interleaving unit 304, and generates a modulation symbol. A modulation scheme of data modulation may be different for each stream. The IFFT unit 306 allocates the modulation symbol from the modulation unit 305 to each subcarrier, performs frequency-to-time conversion by IFFT or the like, and generates a time domain signal.

The multiplexing unit 306 multiplexes the time domain signal generated by the IFFT unit 305 with a pilot signal generated by the pilot signal generation unit 310 and a retransmission control signal generated by the retransmission control signal generation unit 311. In this regard, only the multiplexing unit 306 provided in the stream signal generation unit 301-1 multiplexes the retransmission control signal therewith. Each of the stream signal generation units 206 provided in the stream signal generation units 301-2 to 301-Ns multiplexes the above-described time domain signal with the above-described pilot signal. The pilot signal generation unit 310 generates a pilot signal to be used for channel estimation of each stream signal at a receiving side. Preferably, an orthogonal pilot signal is generated for each stream.

The retransmission control signal generation unit 311 determines the number of retransmissions of a packet to be transmitted in each stream on the basis of reception success/failure information of each packet from the recovery unit 312, and generates a retransmission control signal to report the determined number of retransmissions to a reception device. That is, the retransmission control signal generation unit 311 generates a retransmission control signal in which the number of packet transmissions is incremented by 1 upon receipt of the success/failure information indicating packet reception failure, and generates a retransmission control signal indicating an initial transmission packet by setting the number of retransmissions of the next packet to be transmitted using the same stream as the successfully received stream to "0" upon receipt of the success/failure information indicating packet reception success. Here, the retransmission control signal generation unit 311 is connected to the multiplexing unit 307 provided in the stream signal generation unit 301-1 and the retransmission control signal generated by the retransmission control signal generation unit 311 is configured to be multiplexed into a stream generated by the stream signal generation unit 301-1, but the present invention is not limited thereto. To enable multiplexing into another stream (a plurality of streams) to be performed, the retransmission control signal generation unit 311 may be connected to the multiplexing unit 307 of any one of the other stream signal generation units 301-2 to 301-N, and the retransmission control signal may be configured to be multiplexed into a stream generated by the stream signal generation unit. Also, the retransmission control signal generation unit 311 may generate a retransmission control signal including a data modulation scheme, the number of streams, a puncturing pattern, and the like.

The GI insertion unit 308 inserts a GI into an output signal of the multiplexing unit 307. The transmission unit 309 converts an output signal from the GI insertion unit 308 into an analog signal (D/A conversion), performs band limitation by a filtering process, and further performs conversion into a transmittable frequency band. The same process is performed in the stream signal generation units 301-2 to 301-Ns other than the stream signal generation unit 301-1, and output signals from the stream signal generation units are transmitted to the antenna units 302-2 to 302-Ns corresponding thereto, so that the transmission device 300 transmits a signal into which an initial transmission packet or a retransmission packet is spatially multiplexed. Signals respectively transmitted from the antenna units 302-1 to 302-Ns are referred to as streams 1 to Ns.

In this embodiment, the case in which a retransmission packet is transmitted from the same stream and the same antenna as those of an initial transmission packet has been described, but the retransmission packet may be transmitted from a different antenna for each number of retransmissions. Hereinafter, a retransmission packet will be described as being transmitted from the same stream and the same antenna even in the packet reception device 400.

Figure 13:
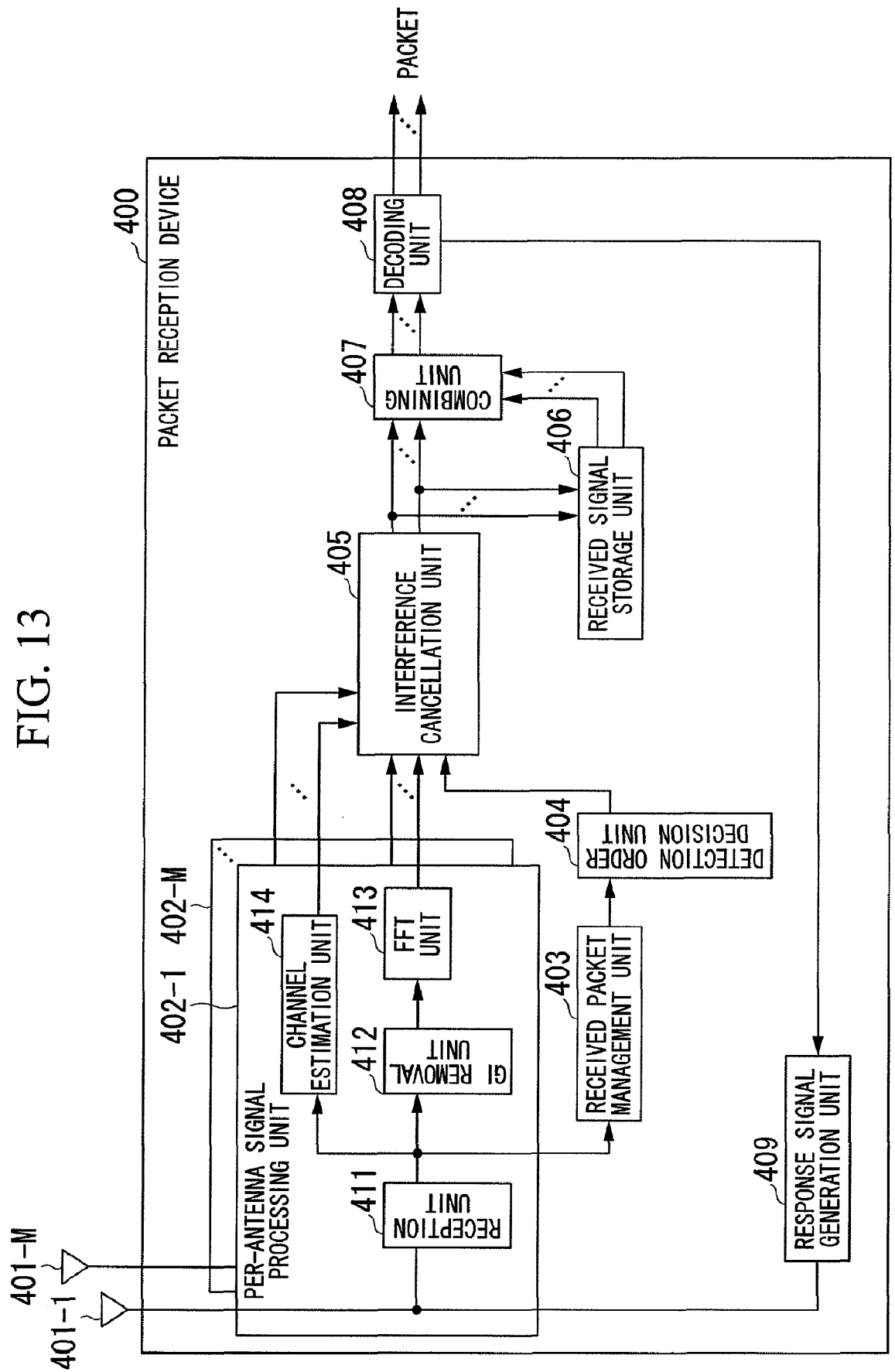
FIG. 13 is a schematic block diagram showing the configuration of a packet reception device 400 according to the same embodiment.

FIG. 13 is a schematic block diagram showing the configuration of the packet reception device 400 according to this embodiment. For example, the packet reception device 400 is provided in a mobile station in downlink by a wireless communication system, and a base station in uplink. Also, the packet reception device 400 is provided in a relay station in the downlink between the base station and the relay station.

The packet reception device 400 has antenna units 401-1 to 401-M (where M is the number of receive antennas), per-antenna signal processing units 402-1 to 402-M, a received packet management unit 403, a detection order decision unit 404, an interference cancellation unit 405, a received signal storage unit 406, a combining unit 407, a decoding unit 408, and a response signal generation unit 409.

The per-antenna signal processing units 402-1 to 402-M receive and process signals received via the antenna units 401-1 to 401-M corresponding thereto, and include reception units 411, GI removal units 412, FFT units 413, and channel estimation units 414. Here, the per-antenna signal processing unit 402-1 is described, but the per-antenna signal processing units 402-2 to 402-M also have the same configuration as the per-antenna reception processing unit 402-1, except that antenna units corresponding thereto are the antenna units 401-2 to 401-M and no signal is outputted therefrom to the received packet management unit 403. The reception unit 411 converts a signal received from the packet transmission device 300 via the antenna unit 401-1 into a frequency band in which signal processing is possible in a signal detection process or the like, performs band limitation by a filtering process, and converts an analog signal into a digital signal (A/D conversion).

Each of the channel estimation units 414 compares a pilot signal included in the digital signal into which the reception unit 411 performs conversion with a known pilot signal upon transmission in a corresponding unit, estimates a channel characteristic between each of the antenna units 301-1 to 301-Ns of the packet transmission device 300 and the antenna unit 401-1 of the packet reception device 400, and outputs a channel estimation value. Another signal such as a control channel, a preamble, or the like by which a channel can be estimated may be used. The GI removal unit 412 removes a GI included in the digital signal into which the reception unit 411 performs conversion. The FFT unit 413 converts a signal from which the GI removal unit 412 removes the GI into a frequency domain signal by performing an FFT process. The same process is performed in the other per-antenna signal processing units 402-2 to 402-M as well.

Here, a signal $R_p(k)$ for a $k^{th}$ subcarrier of a received packet of the $p^{th}$ time in HARQ can be expressed by Expression (7) in an N×M MIMO system in which the number of transmitting antennas and the number of receiving antennas are N and M, respectively. Here, $H_p(k)$ is channel characteristics between transmitting antennas and receiving antennas, $S_p(k)$ is a transmission signal of each transmitting antenna, $N(k)$ is noise of each receiving antenna, and the superscript T denotes a transpose matrix.

[Equation 6]

$$R_p(k) = H_p(k)S_p(k) + N(k) \qquad \text{EXPRESSION (7)}$$

$$R_p(k) = [\ R_1(k)\ \ldots\ R_M(k)\ ]^T$$

$$H_p(k) = \begin{pmatrix} H_{p,11}(k) & \cdots & H_{p,1N}(k) \\ \vdots & \ddots & \vdots \\ H_{p,M1}(k) & \cdots & H_{p,MN}(k) \end{pmatrix}$$

$$S_p(k) = [\ S_{p,1}(k)\ \ldots\ S_{p,N}(k)\ ]^T$$

$$N(k) = [\ N_1(k)\ \ldots\ N_M(k)\ ]^T$$

The received packet management unit 403 extracts data regarding transmission parameters such as information indicating the number of retransmissions of whether a stream transmitted from each of the antenna units 302-1 to 302-N(s) of the transmission device 300 transmits an initial transmission packet or a retransmission packet (specifically, how many times a retransmission packet is transmitted), a data modulation scheme, a puncturing pattern, and the like from a retransmission control signal included in a received signal. The detection order decision unit 404 decides the order of a signal detected by the interference cancellation unit 405 on the basis of information indicating the number of retransmissions extracted by the received packet management unit 403, and notifies the interference cancellation unit 405 of the order of signal detection. Details of order decision of the detection order decision unit 404 will be described later.

The interference cancellation unit 405 outputs coded bit LLRs of packets respectively transmitted from the antenna units 302-1 to 302-N(s) of the packet transmission device 300 from frequency domain data signals outputted by the FFT units 413 of the per-antenna signal processing units 402-1 to 402-M based on the detection order decided by the detection order decision unit 404, on the basis of channel estimation values outputted from the channel estimation units 414 and data regarding transmission parameters of packets outputted from the received packet management unit 403. Details of the operation of the interference cancellation unit 405 will be described later.

The received signal storage unit 406, the combining unit 407, and the decoding unit 408 respectively have plural sets of the same functions as those of the received signal storage unit 209, the combining unit 210, and the decoding unit 211 shown in FIG. 6, the number of the sets corresponding to the stream number Ns, and perform processes for the Ns streams in parallel, but are different from the received signal storage unit 209, the combining unit 210, and the decoding unit 211 in the first embodiment in that each process for each code channel is performed. The response signal generation unit 409 also has the same function as the response signal generation unit 212 in the first embodiment.

Next, an example in which the detection order decision unit 404 decides the order of detection of spatially multiplexed signals using MIMO on the basis of information indicating the number of retransmissions will be described. The case in which the transmission device transmits signals using 4 transmit antennas of the antenna units 302-1 to 302-N(s) (N=4) will be described. A transmission signal outputted from each of the antenna units 302-1 to 302-N(s) (N=4) is referred to as a stream.

Figure 16:
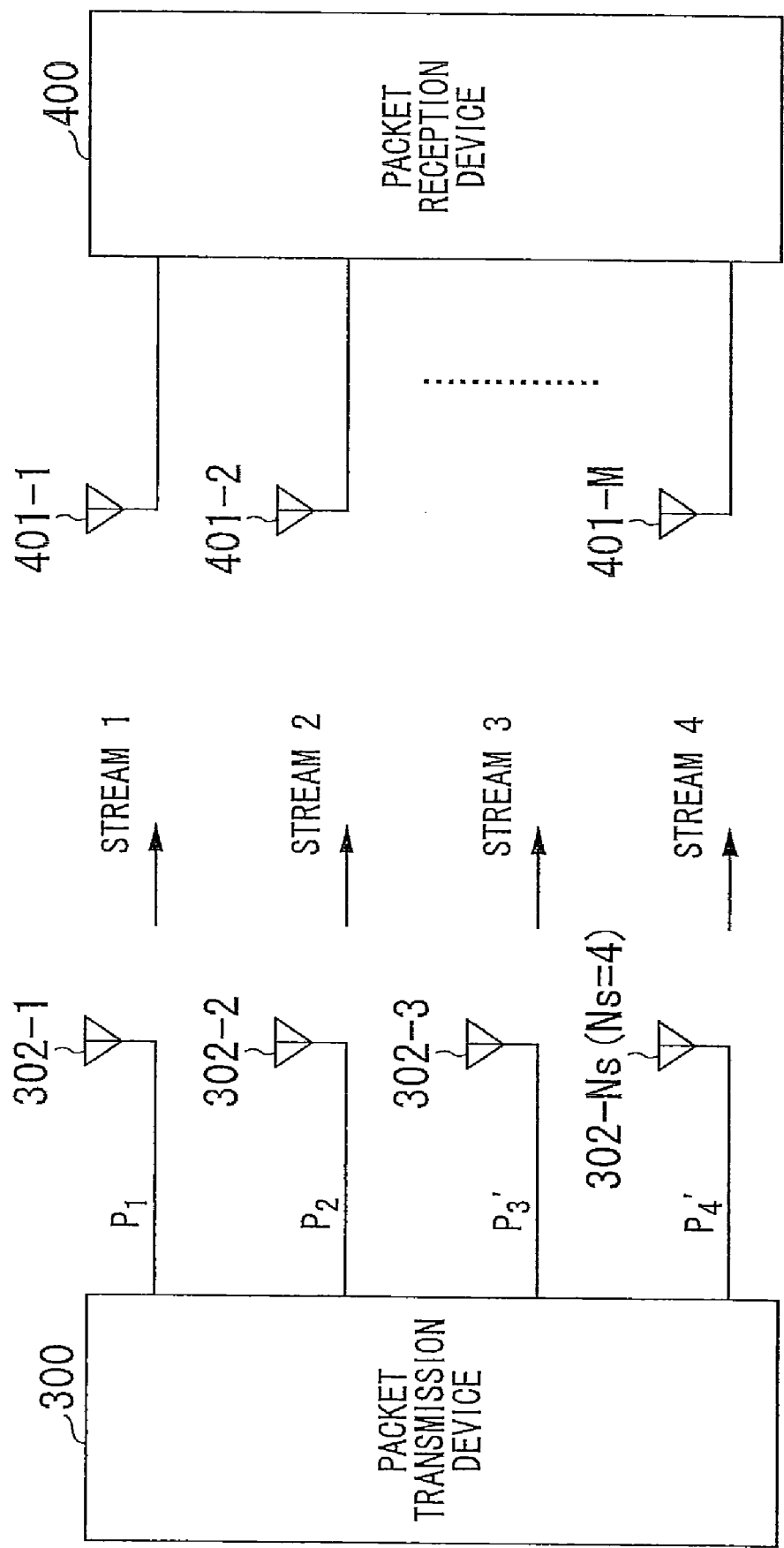
FIG. 16 is a diagram illustrating spatial multiplexing of a stream to be transmitted by the packet transmission device 300 according to the same embodiment.

For example, as shown in FIG. 16, the packet transmission device 300 simultaneously transmits a stream 1 including an initial transmission packet $P_1$ from the antenna unit 302-1 to the antennas 401-1 to 401-4 of the packet reception device 400, a stream 2 including an initial transmission packet $P_2$ from the antenna unit 302-2 to the antennas 401-1 to 401-4 of the packet reception device 400, a stream 3 including a first retransmission packet $P_3'$ from the antenna unit 302-3 to the antennas 401-1 to 401-4 of the packet reception device 400, and a stream 4 including a first retransmission packet $P_4'$ from the antenna unit 302-4 to the antennas 401-1 to 401-4 of the packet reception device 400. It is assumed that the packet reception device 400 receives signals into which the streams 1 to 4 are spatially multiplexed by the antenna units 401-1 to 401-4. The transmission device 300 transmits a retransmission control signal indicating the number of retransmissions of the packets $P_1$, $P_2$, $P_3'$, and $P_4'$ along with the packets. It is assumed that the packets $P_3'$ and $P_4'$ are respectively retransmission packets for initial transmission packets $P_3$ and $P_4$.

The packet transmission device 300 performs a puncturing process on the initial transmission packet by the pattern 1 shown in FIG. 4, and performs a puncturing process on the retransmission packet by the pattern 2 shown in FIG. 4.

The received packet management unit 403 of the packet reception device 400 acquires the number of retransmissions of a packet transmitted in each stream from a retransmission control signal included in a signal received by the per-antenna signal processing unit 402-1 via the antenna unit 401-1. Here, for example, as shown in FIG. 16, the packets $P_1$, $P_2$, $P_3'$, and $P_4'$ are respectively transmitted in the streams 1 to 4, and the received packet management unit 403 obtains information indicating that the packets $P_1$ and $P_2$ are $0^{th}$ retransmission (initial transmission packets), the packet $P_3'$ is first retransmission (retransmission packet), and the packet $P_4'$ is first retransmission (retransmission packet) from the retransmission control signal.

On the basis of the information indicating the number of retransmissions acquired by the received packet management unit 403, the detection order decision unit 404 decides a detection order so that detection is first performed from a stream in which an initial transmission packet is transmitted. In FIG. 16, the detection order is decided so that the stream 1 and the stream 2 including the packets $P_1$ and $P_2$ are first detected and thereafter the stream 3 and the stream 4 including the retransmission packets $P_3'$ and $P_4'$ are detected.

The interference cancellation unit 405 preferentially performs a signal detection process for a stream in which an initial transmission packet is transmitted according to the detection order decided by the detection order decision unit 404, removes an interference replica generated from an initial transmission packet detection signal thereof, and performs a signal detection process for a stream in which a retransmission packet is transmitted. Consequently, the detection process is performed in order from the initial transmission packet, and accordingly, when a signal of a retransmission packet is detected, the signal of the retransmission packet is detected from a signal from which an interference component resulting from the initial transmission packet is removed, thus improving the accuracy of signal detection from a retransmission packet. A signal having a large number of systematic bits can be accurately detected from a received signal. Since a signal of the initial transmission packet can be accurately detected by including all systematic bits in the initial transmission packet as in the puncturing pattern shown in FIG. 4, the accuracy of an interference replica generated from the detected initial transmission packet signal becomes high, an interference component to the retransmission packet can be accurately removed, and the accuracy of signal detection of the retransmission packet can be improved.

An example in which the packet transmission device 300 uses the puncturing patterns shown in FIG. 4 has been described in this embodiment. However, by deciding the detection order of streams as in the case in which FIG. 4 is used even in the case in which a puncturing process is performed on the initial transmission packet by using the pattern 1 shown in FIG. 5 as the puncturing pattern and a puncturing process is performed on the transmission packet by using the pattern 2 shown in FIG. 5 as the puncturing pattern, signal detection is performed from the initial transmission packet having a large number of systematic bits, the accuracy of an interference replica to the retransmission packet is improved, and the accuracy of signal detection of the retransmission packet can be improved. The detection order decision unit 404 may decide a detection order based on the number of retransmissions of a packet constituting a stream, and may also decide a detection order on the basis of a reception level such as an SINR by first detecting a packet having a higher SINR among packets of the same number of retransmissions.

The detection order decision unit 404 may decide the order to sequentially detect packets of streams one stream by one stream (separate stream interference cancellation and MIMO spatial multiplexing) on the basis of the number of retransmissions of packets constituting streams, and may decide the order to sequentially detect packets of streams for each group by grouping streams on the basis of the number of retransmissions of packets. As an example of decision for each group, grouping may be performed by whether a packet constituting a stream is an initial transmission packet or a retransmission packet, or the like.

Figure 14:
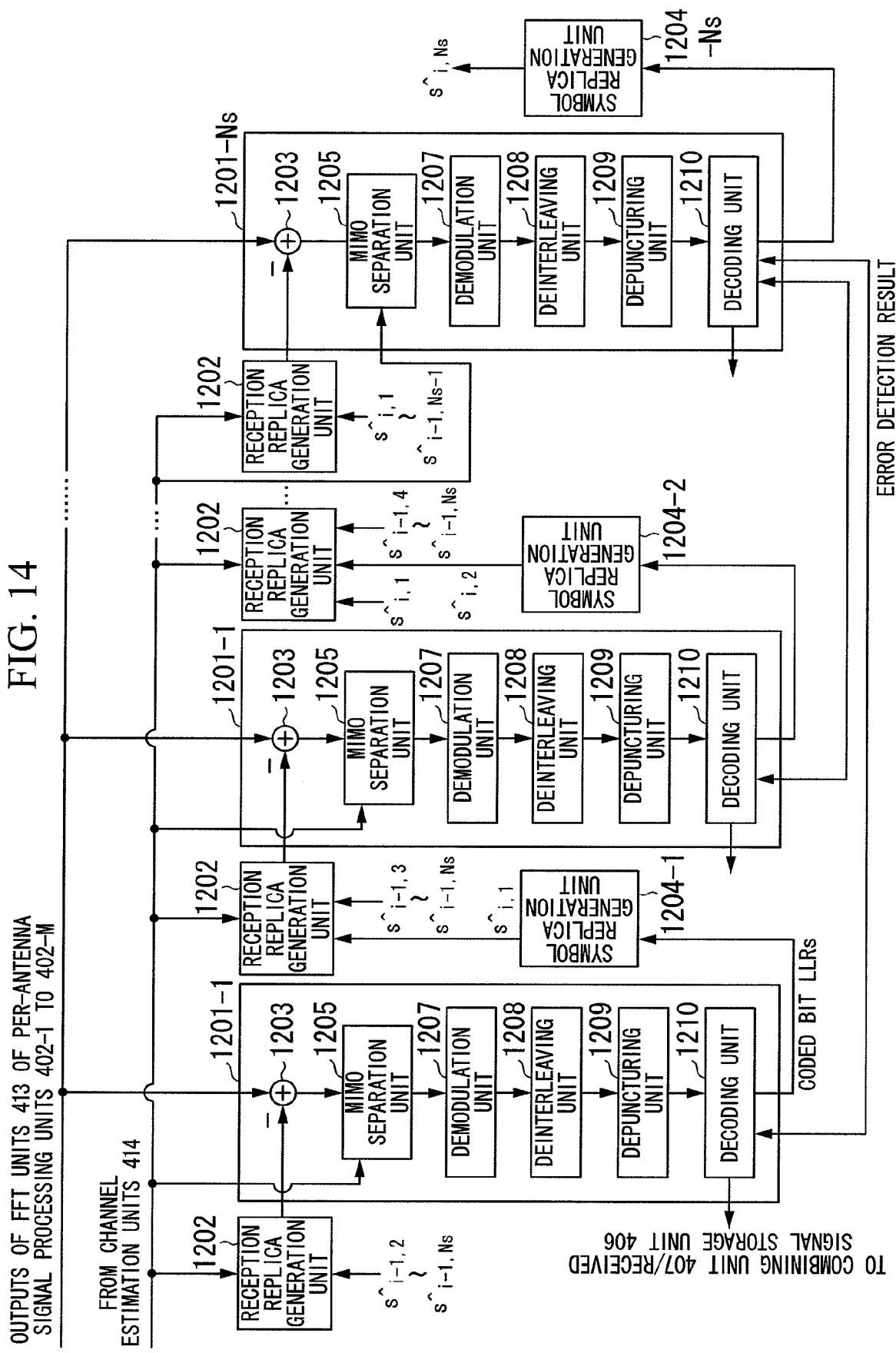
FIG. 14 is a schematic block diagram showing the configuration of an interference cancellation unit 405 which performs successive iterative interference cancellation from a spatially multiplexed signal according to the same embodiment.

FIG. 14 is a schematic block diagram showing the configuration of the interference cancellation unit 405 which performs successive iterative interference cancellation on spatially multiplexed signals. The interference cancellation unit 405 receives spatially multiplexed signals including the stream 1 in which a packet $P_1$ is transmitted from the antenna unit 302-1 by the packet transmission device 300 as shown in FIG. 16, the stream 2 in which the packet $P_2$ is transmitted from the antenna unit 302-2, the stream 3 in which the packet $P_3'$ is transmitted from the antenna unit 302-3, and the stream 4 in which the packet $P_4'$ is transmitted from the antenna unit 302-4. The interference cancellation unit 405 successively detects the streams in order on the basis of the detection order of the streams 1 to 4 decided by the detection order decision unit 404. A series of processes (detection processes for the streams 1 to 4) performed by the interference cancellation unit 405 is repeated by the predetermined number of times, except for the case in which all information bits can be detected without error in the middle.

The interference cancellation unit 405 has stream detection units 1201-1 to 1201-Ns, Ns reception replica generation units 1202, and symbol replica generation units 1204-1 to 1204-Ns, removes interference signal replicas from frequency domain data signals outputted by the FFT units 413 of the per-antenna signal processing units 402-1 to 402-M, and performs separation of spatially multiplexed streams and demodulation and decoding processes for the streams.

The stream detection unit 1201-1 detects a signal of the stream 1 whose detection order is first, the stream detection unit 1201-2 detects a signal of the stream 2 whose detection order is second, the stream detection unit 1201-3 detects a signal of the stream 3 whose detection order is third, and the stream detection unit 1201-Ns (Ns=4) detects a signal of the stream Ns whose detection order is $Ns^{th}$. The symbol replica generation unit 1204-1 generates a symbol replica of a signal constituting the stream 1, the symbol replica generation unit 1204-2 generates a symbol replica of a signal constituting the stream 2, the symbol replica generation unit 1204-3 generates a symbol replica of a signal constituting the stream 3, and the symbol replica generation unit 1204-Ns (Ns=4) generates a symbol replica of a signal constituting the stream Ns.

Each of the stream detection units 1201-1 to 1201-Ns has a subtraction unit 1203, a MIMO separation unit 1205 (stream separation unit), a demodulation unit 1207, a deinterleaving unit 1208, a depuncturing unit 1209, and a decoding unit 1210. The subtraction units 1203 subtract interference replicas (stream replicas) generated by the reception replica generation units 1202 from output signals of the FFT units 413 of the per-antenna signal processing units 402-1 to 402-M. In an $i^{th}$ iterative process, an output signal $R^\sim_{n,i,m}(k)$ of the per-antenna signal processing unit 402-$m$ ($1 \leq m \leq M$) of the subtraction unit 1203 of the stream detection unit 1201-$n$ becomes the following Expression (8). Here, $R_m(k)$ denotes a frequency domain signal of a $k^{th}$ subcarrier outputted by the FFT unit 413 of the per-antenna signal processing unit 402-$m$, $R^\wedge_{n,i,m}(k)$ denotes an interference replica of the $k^{th}$ subcarrier for a stream n received by the antenna 401-$m$ in the $i^{th}$ iterative process, and k denotes a subcarrier index.

[Equation 7]

$$R^\sim_{n,i,m}(k) = R_m(k) - R^\wedge_{n,i,m}(k) \qquad \text{EXPRESSION (8)}$$

The reception replica generation units 1202 generate replicas of interference signals (replicas of received signals) using symbol replicas generated by the symbol replica generation units 1204-1 to 1204-Ns and channel estimation values generated by the channel estimation units 414. For example, the reception replica generation unit 1202 that inputs a replica of an interference signal to the stream detection unit 1201-$n$ for detecting a signal of a stream n (n=1, 2, . . . Ns) generates a replica of an interference signal obtained by multiplying symbol replicas of streams 1 to (n−1) and streams (n+1) to Ns by channel estimation values and combining the resultant replicas.

Specifically, in the $i^{th}$ iterative process, a replica of an interference signal is generated as an interference component of a received signal using symbol replicas of the streams 1 to (n−1) generated in the $i^{th}$ iterative process, symbol replicas of the streams (n+1) to Ns generated in the $i-1^{th}$ iterative process, and channel estimation values. A replica $R^\wedge_{n,i,m}(k)$ of an interference signal outputted by the reception replica generation unit 1202 for a stream n received by the antenna 401-$m$ in the $i^{th}$ iterative process becomes the following Expression (9). Here, $H_{u,m}(k)$ denotes a channel estimation value of a stream u received by the antenna 401-$m$, and $S^\wedge_{u,i}(k)$ denotes a symbol replica of a stream u generated by the symbol replica generation unit 1204-$u$ in the $i^{th}$ iterative process. When i=1 (first iterative process), a replica of an interference signal is generated from only symbol replicas of the streams 1 to (n−1) generated until a detection process of the stream n and the propagation estimation values. The above-described interference cancellation process is performed on signals received by all the antennas 401-1 to 401-M.

[Equation 8]

$$R^\wedge_{n,i,m}(k) = \left( \sum_{u=1}^{n-1} H_{u,m}(k) S^\wedge_{u,i}(k) + \sum_{u=n+1}^{N} H_{u,m}(k) S^\wedge_{u,i-1}(k) \right) \qquad \text{EXPRESSION (9)}$$

On the basis of the channel estimation values, which are outputs of the channel estimation units 414, the MIMO separation units 1205 perform stream separation on spatially multiplexed (MIMO) signals and channel compensation for outputs of the subtraction units 1203, and generate modulation symbol sequences of the streams. Specifically, stream signals are reproduced by maximum likelihood estimation. Alternatively, a separation method of calculating zero forcing (ZF) or MMSE weights for outputs of the subtraction units 123 and multiplying the outputs of the subtraction units 1303 by the calculated weights is used. For example, weight coefficients $W_{ZF,n}(k)$ and $W_{MMSE,n}(k)$ based on ZF and MMSE criteria of the MEMO separation unit 1205 belonging to the stream detection unit 1201-$n$ can be expressed by the following Expressions (10) and (11). Here, the superscript H is the complex conjugate transpose of a matrix, the superscript −1 is an inverse matrix, $\sigma^2$ is noise power, and $I_N$ is an N×N unit matrix. $H_n(k)$ is Expression (12) in a first process (i=1) in an iterative SIC, and $H_n(k)$ is Expression (13) in an iterative process (i>1) in an iterative SIC.

[Equations 9]

$$W_{ZF,n}(k) = H_n^H(k)(H_n(k)H_n^H(k))^{-1})$$  EXPRESSION (10)

$$W_{MMSE,n}(k) = H_n^H(k)(H_n(k)H_n^H(k) + \sigma^2 I_M)^{-1}$$  EXPRESSION (11)

$$H_n(k) = \begin{pmatrix} H_{1n}(k) & \cdots & H_{1N}(k) \\ \vdots & \ddots & \vdots \\ H_{Mn}(k) & \cdots & H_{MN}(k) \end{pmatrix}$$  EXPRESSION (12)

$$H_n(k) = \begin{pmatrix} H_{1n} \\ \vdots \\ H_{Mn} \end{pmatrix}$$  EXPRESSION (13)

The demodulation unit 1207 performs a demodulation process on a modulation symbol sequence as an output signal from the MIMO separation unit 1205, and extracts a signal for each coded bit. Preferably, an LLR is outputted for each coded bit as in the demodulation unit 608 of the first embodiment shown in FIG. 8. The deinterleaving unit 1208 performs a deinterleaving process on a signal of each coded bit outputted by the demodulation unit 1207. The deinterleaving process is a rearrangement for returning the order, rearranged by the interleaving unit 112 in the interleaver unit of the packet transmission device 300, to the original.

The depuncturing unit 1209 performs an inverse process to a puncturing (bit removing) process performed by the puncturing unit 124 included in the packet transmission device 300. That is, a depuncturing process is performed to insert a predetermined virtual value into punctured bits. The depuncturing unit 1209 uses the same puncturing pattern as that of the puncturing unit 124 included in the packet transmission device 300 as the puncturing pattern. That is, a depuncturing process for an initial transmission packet is performed on the basis of the pattern 1 shown in FIG. 4, and a depuncturing process for a retransmission packet is performed on the basis of the pattern 2 shown in FIG. 4.

For an output signal of the depuncturing unit 1209, the decoding unit 1210 outputs coded bit LLRs as a soft decision result by an error correction decoding process to turbo coding, convolutional coding or the like performed by the error correction coding unit 122 of the packet transmission device 300. The symbol replica generation units 1204-1 to 1204-Ns generate symbol replicas of streams by using the coded bit LLRs generated by the decoding units 1210. The decoding unit 1210 performs an error detection process on a packet by an error detection of CRC or the like applied by the error detection coding unit 121 of the packet transmission device 300, and outputs error detection information. A result of the error detection process is inputted to the decoding unit 1210 of the stream separation unit 1201-Ns which detects a signal of the last stream. When no error exists in all error detection process results of the decoding units 1210 or when the number of iterations of the iterative process counted by the decoding units 1210 reaches the predetermined number of iterations (the maximum number of times), the decoding unit 1210 of the stream separation unit 1201-Ns receiving the input ends the iterative process (stops an output to the symbol replica generation unit 1204-Ns), and outputs coded bit LLRs of the error correction decoding results by the decoding units 1210 to the combining unit 407 and the received signal storage unit 406.

Figure 15:
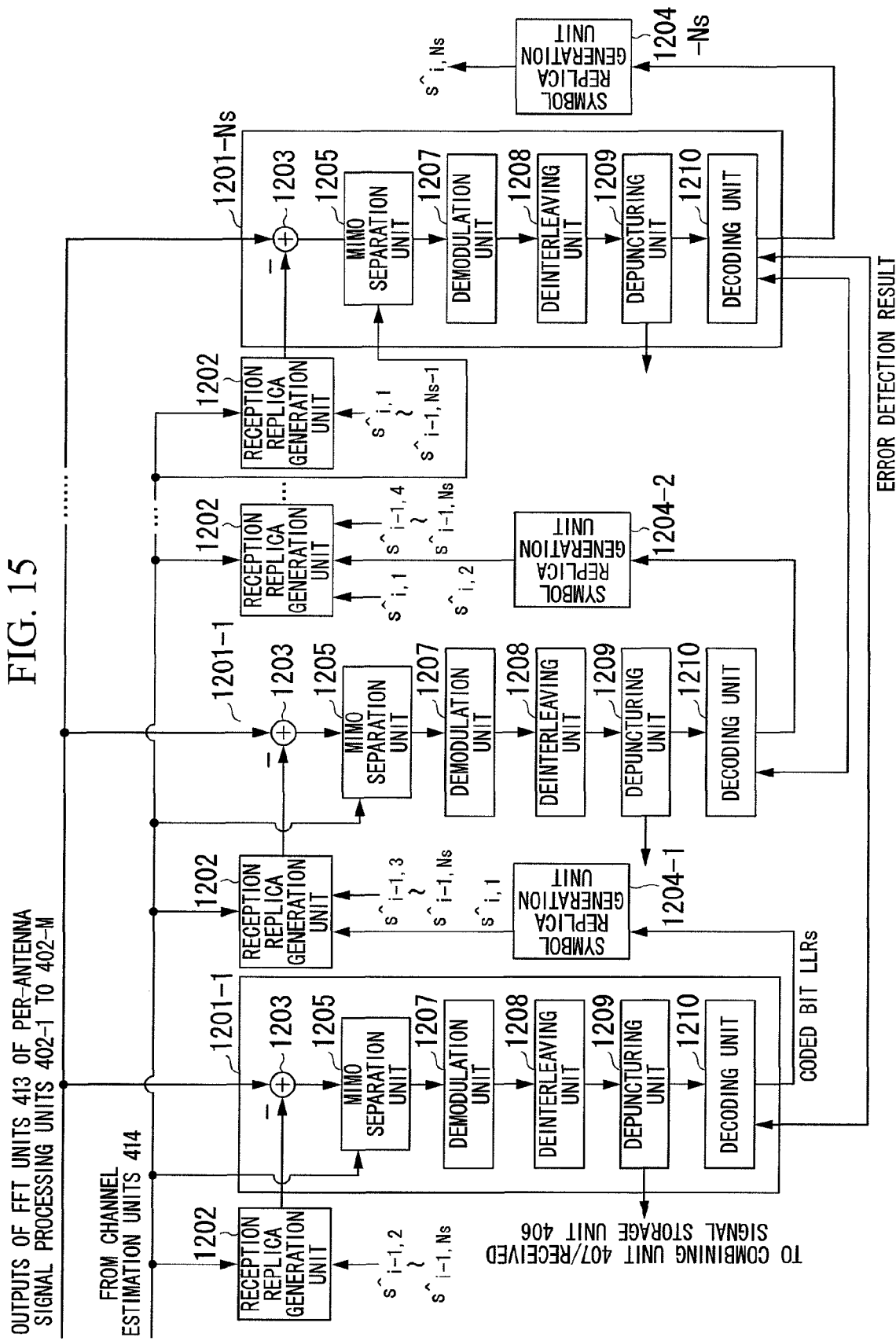
FIG. 15 is a schematic block diagram showing a modified example of the configuration of the interference cancellation unit 405 according to the same embodiment.

Here, as shown in FIG. 15, an output signal of the depuncturing unit 1209 instead of the decoding unit 1210 as a signal to be outputted to the combining unit 407 and the received signal storage unit 406 may also be inputted to the combining unit 407 and the received signal storage unit 406.

Figure 17:
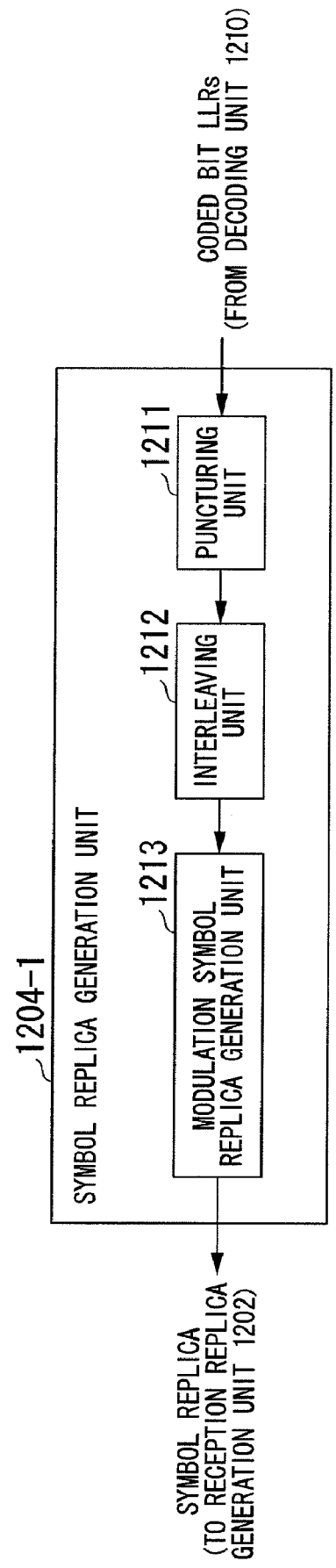
FIG. 17 is a schematic block diagram showing the configuration of a symbol replica generation unit 1204-1 according to the same embodiment.

FIG. 17 is a schematic block diagram showing the configuration of the symbol replica generation unit 1204-1. The other symbol replica generation units 1204-2 to 1204-Ns have the same configuration. The symbol replica generation unit 1204-1 generates a symbol replica on the basis of coded bit LLRs outputted by the stream separation unit 1201-1 every time signal detection of a signal of the stream 1 is completed, and has a puncturing unit 1211, an interleaving unit 1212, and a modulation symbol replica generation unit 1213.

Like the puncturing unit 621 shown in FIG. 10, the puncturing unit 1211 performs a puncturing process on coded bit LLRs as an output signal of the decoding unit 1210 by using the same pattern (the puncturing pattern shown in FIG. 4) as a pattern applied by the puncturing unit 124 of the packet transmission device 300 for each stream (packet). Like the interleaving unit 622 shown in FIG. 10, the interleaving unit 1212 performs a rearrangement process on the bit arrangement of an output signal from the puncturing unit 1211 by using the same pattern as a pattern applied by the interleaving unit 304 of the packet transmission device 300 for each stream (packet).

Like the modulation symbol replica generation unit 623 shown in FIG. 10, the modulation symbol replica generation unit 1213 generates a modulation symbol replica by modulating an output signal from the interleaving unit 1212 in the same modulation scheme as that of the modulation unit 305 of the packet transmission device 300 shown in FIG. 12 such as QPSK modulation, 16QAM modulation, or the like. The modulation symbol replica generation unit 1213, that is, the symbol replica generation unit 1204-1, inputs the generated symbol replica to each of the reception replica generation units 1202 which generate replicas of interference signals to the streams 2 to N.

The symbol replica generation units 1204-1 to 1204-Ns generate symbol replicas using coded bit LLRs outputted from the decoding units 1210 in the successive iterative interference cancellation process, but may generate the symbol replicas using coded bit LLRs outputted from the depuncturing units 1209.

Figure 18:
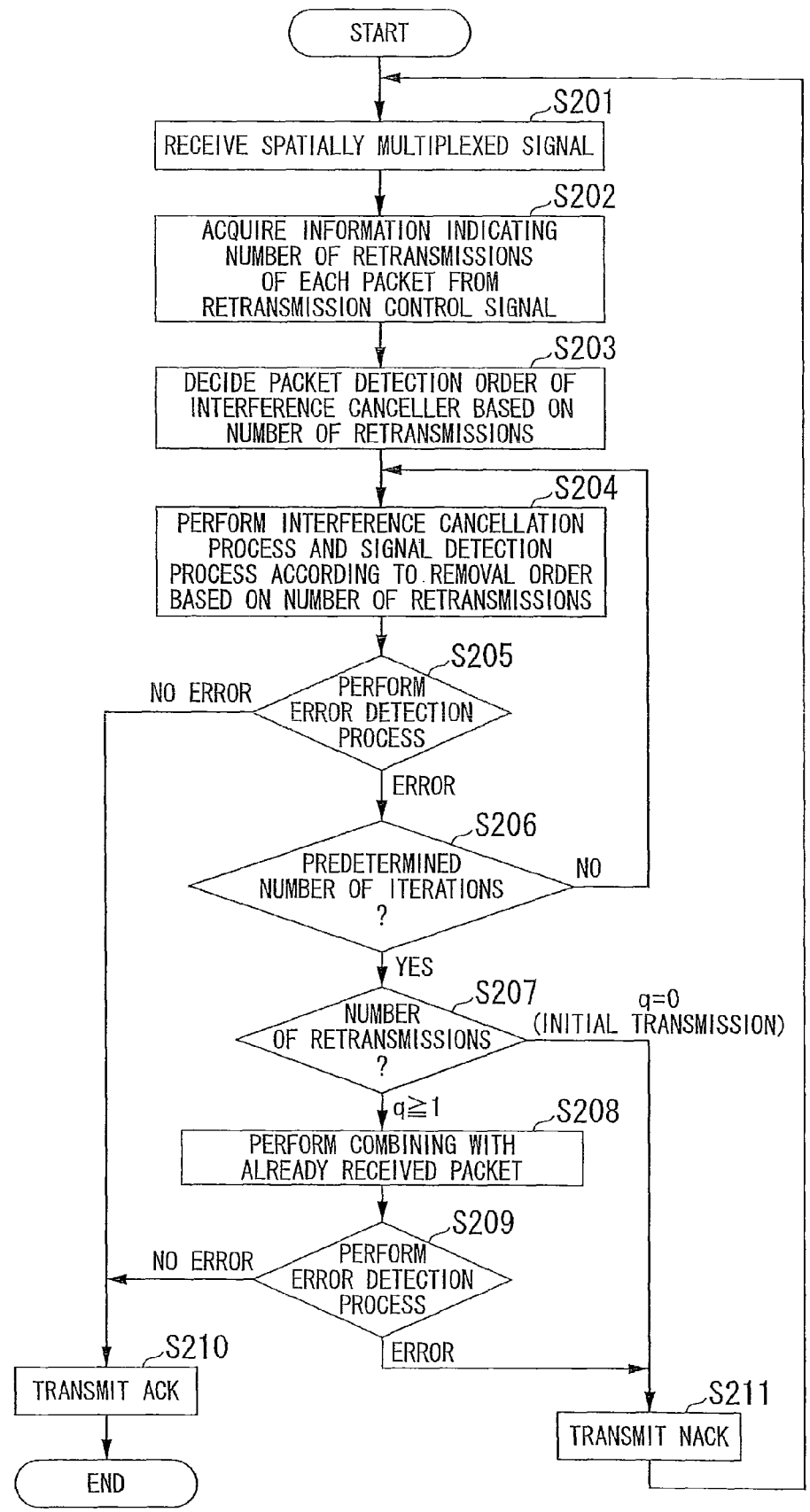
FIG. 18 is a flowchart illustrating a reception operation of the packet reception device 400 according to the same embodiment.

FIG. 18 is a flowchart illustrating a reception operation of the packet reception device 400. If the packet reception device 400 receives a spatially multiplexed signal (S201), the received packet management unit 403 acquires information indicating the number of retransmissions of a packet constituting each stream from a retransmission control signal included in the received signal (S202). The detection order decision unit 404 decides the order of detection of packets (the order of detection of streams) from the information indicating the number of retransmissions acquired in step S202 (S203). According to the order of detection of packets decided in step S203, the interference cancellation unit 405 sequentially performs an interference cancellation process and a signal detection process for the packet streams (S204). The decoding units 1210 determine whether an error exists in packets from which signals are detected (S205). If it is determined that no error exists in all the packets, a response signal (ACK) indicating that no error exists is returned to the packet transmission device 300 (S210), and the process is terminated.

On the other hand, when it is determined that an error exists in any one packet in step S205, it is determined whether or not the number of iterative processes of an interference cancellation process and a signal detection process for a series of streams reaches the predetermined number of iterations (S206). When the number of iterative processes does not reach the predetermined number of iterations, the interference cancellation process and the signal detection process for the streams are performed once again by returning to step S204. When it is determined that the number of iterative processes reaches the predetermined number of iterations in the determination of step S206, the number of retransmissions of a packet constituting each stream is determined (S207). When it is determined to be an initial transmission packet (q=0), a response signal (NACK) indicating a retransmission request is returned to the packet transmission device 300 (S211).

When it is determined to be a retransmission packet (q≧1) in the determination of step S207, the retransmission packet is combined with a previously received initial transmission or retransmission packet stored by the received signal storage unit 406 (S208). The decoding unit 408 performs an error detection process after performing an error correction decoding process for a combining result (S209). If no error is found as a result of the error detection process, the response signal (ACK) indicating that no error is present is returned to the transmission source (S210), and the reception process is terminated. If an error is present as a result of the error detection process in step S209, the response signal (NACK) indicating the retransmission request is returned to the transmission source (S211) and it is in a reception state for the next received signal by returning to step S201.

The iterative SIC is used for detection of a signal spatially multiplexed in MIMO in this embodiment, but another separation method of sequentially detecting a stream of V-BLAST or the like may be used.

The case in which a signal spatially multiplexed in MIMO is received has been described in this embodiment, but the present invention may be equally applicable even when code-multiplexed and spatially multiplexed signals are received, and the detection of a code-multiplexed signal of the first embodiment and the detection of a spatially-multiplexed signal of this embodiment may be combined and applied.

In this embodiment as described above, the detection order decision unit 404 of the packet reception device 400 decides the order of signal detection so that detection is performed from a packet of which the number of transmissions is small among spatially-multiplexed packets, and the interference cancellation unit 405 detects a signal of a retransmission packet after detecting a signal from an initial transmission packet according to the signal detection order and removing an interference component resulting from a signal of a packet from which the signal is detected from a received signal. Thus, when the signal detection is performed on a retransmission packet, the signal detection is performed on a signal from which more interference components are removed, thus performing the signal detection with high accuracy. Accordingly, delay can be prevented from being increased due to the number of retransmissions of a specific packet being increased.

The puncturing unit 124 of the packet transmission device 300 performs a puncturing process using a puncturing pattern including a larger number of systematic bits of an initial transmission packet than that of a retransmission packet. Accordingly, since the initial transmission packet detected more preferentially than the retransmission packet includes a larger number of systematic bits, the interference cancellation unit 405 of the packet reception device 400 can accurately detect a signal of the initial transmission packet, the accuracy of removing an interference component for a signal of the retransmission packet on the basis of the signal of the initial transmission packet can be improved, and the signal detection of the retransmission packet can be accurately performed.

In the transmission units 309 of the stream signal generation units 301-1 to 301-Ns of the packet transmission device 300, transmission power to be allocated is increased as the number of packets having the small number of retransmissions is increased. Accordingly, the interference cancellation unit 405 of the packet reception device 400 can more accurately detect signals of a packet and an initial transmission packet of which the number of retransmissions is small. Consequently, an interference component to a signal of a retransmission packet can be accurately removed on the basis of a signal of the initial transmission packet, and a signal of the retransmission packet can be accurately detected. When the retransmission packet is detected, a detection process is performed on a signal from which an interference component resulting from a retransmission packet of which the number of retransmissions is smaller than that of a retransmission packet to be detected is removed, so that a signal of which the number of retransmissions is large can be accurately detected.

In the stream signal generation units 301-1 to 301-N of the packet transmission device 300, allocation is performed to transmit a signal from an antenna for which a channel eigenvalue in MIMO transmission is increased as the number of packets having the small number of retransmissions is increased. Accordingly, the interference cancellation unit 405 of the packet reception device 400 can accurately detect signals of a packet and an initial transmission packet of which the number of retransmissions is small. The channel eigenvalue is one index indicating the quality of each stream obtained by performing singular value decomposition on a matrix having an element of a channel response of each stream transmitted from a transmit antenna. A large channel eigenvalue indicates a stream capable of being transmitted with high quality.

Consequently, an interference component to a signal of a retransmission packet can be accurately removed on the basis of a signal of the initial transmission packet, and a signal of the retransmission packet can be accurately detected. When the retransmission packet is detected, a detection process is performed on a signal from which an interference component resulting from a retransmission packet of which the number of retransmissions is smaller than that of a retransmission packet to be detected is removed, so that a signal of which the number of retransmissions is large can be accurately detected.

The channel estimation unit 203, the GI removal unit 204, the FFT unit 205, the received packet management unit 206, the detection order decision unit 207, the interference cancellation unit 208, the received signal storage unit 209, the combining unit 210, and the decoding unit 211 in FIG. 6, and the channel estimation unit 414, the GI removal unit 412, the FFT unit 413, the received packet management unit 403, the detection order decision unit 404, the interference cancellation unit 405, the received signal storage unit 406, the combining unit 407, and the decoding unit 408 in FIG. 13 may be implemented by dedicated hardware. These parts are configured by a memory and a central processing unit (CPU), and functions thereof may be implemented by executing a program for implementing the functions of the parts.

A computer-readable recording medium may record a program for implementing functions of the channel estimation unit 203, the GI removal unit 204, the FFT unit 205, the received packet management unit 206, the detection order decision unit 207, the interference cancellation unit 208, the received signal storage unit 209, the combining unit 210, and the decoding unit 211 in FIG. 6, and the channel estimation unit 414, the GI removal unit 412, the FFT unit 413, the received packet management unit 403, the detection order decision unit 404, the interference cancellation unit 405, the received signal storage unit 406, the combining unit 407, and the decoding unit 408 in FIG. 13. A computer system may read and execute the program recorded on the recording medium to perform the process of each part. Here, the "computer system" includes an OS and hardware such as peripheral devices.

The "computer readable recording medium" is a portable medium such as a flexible disc, magneto-optical disc, ROM or CD-ROM, or a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, or a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include modifications without departing from the scope of the present invention.

INDUSTRIAL APPLICABILITY

The present invention is suitable for use in a mobile communication system including a base station device and a mobile station device, but is not limited thereto.

DESCRIPTION OF REFERENCE NUMERALS

100, 300: Packet transmission device
101-1 to 101-N: Code channel signal generation unit
102: Code multiplexing unit
103, 306: IFFT unit
104, 307: Multiplexing unit
105, 308: GI insertion unit
106, 309: Transmission unit
107, 310: Pilot signal generation unit
108, 311: Retransmission control signal generation unit
109, 312: Recovery unit
111, 303: Encoding unit
112, 304: Interleaving unit
113, 305: Modulation unit
114: Spreading unit
120, 302-1 to 302-Ns: Antenna unit
121: Error detection coding unit
122: Error correction coding unit
123: Coded bit storage unit
124: Puncturing unit
200, 400: Packet reception device
201, 401-1 to 401-M: Antenna unit
202, 411: Reception unit
203, 414: Channel estimation unit
204, 412: GI removal unit
205, 413: FFT unit
206, 403: Received packet management unit
207, 404: Detection order decision unit
208, 405: Interference cancellation unit
209, 406: Received signal storage unit
210, 407: Combining unit
211, 408: Decoding unit
212, 409: Response signal generation unit
301-1 to 301-Ns: Stream signal generation unit
402-1 to 402-M: Per-antenna signal processing unit
601: Channel compensation unit
603-1 to 603-N: Code separation unit
604: MCI replica generation unit
605-1 to 605-N: Code channel replica generation unit
606, 1203: Subtraction unit
607: Despreading unit
608, 1207: Demodulation unit
609, 1208: Deinterleaving unit
610, 1209: Depuncturing unit
611, 1210: Decoding unit
621, 1211: Puncturing unit
622, 1212: Interleaving unit
623, 1213: Modulation symbol replica generation unit
624: Spreading unit
1201-1 to 1201-Ns: Stream detection unit
1202: Reception replica generation unit
1204-1 to 1204-Ns: Symbol replica generation unit
1205: MIMO separation unit
3001, 3002: Internal encoder
3003: Internal interleaver

The invention claimed is:

1. A communication device which performs a hybrid automatic repeat request process of requesting a transmission source to perform retransmission when an error is detected from a received signal, the communication device comprising:

a reception unit that receives a signal into which an initial transmission signal and a retransmission signal are multiplexed among signals including the initial transmission signal and the retransmission signal for any one signal;

a detection order decision unit that decides an order of detection of the initial transmission signal and the retransmission signal from the signal received by the reception unit in response to information for determining the initial transmission signal or the retransmission signal from the initial transmission signal and the retransmission signal which are received by the reception unit; and a signal detection unit that removes an interference component from the signal received by the reception unit by using a signal detected by the communication device according to the order decided by the detection order decision unit, and that detects the initial transmission signal and the retransmission signal.

2. The communication device according to claim 1, wherein the detection order decision unit decides the detection order so that the initial transmission signal is detected before the retransmission signal.

3. The communication device according to claim 1, wherein the detection order decision unit further uses a reception level when deciding the order of detection.

4. The communication device according to claim 1, wherein the initial transmission signal and the retransmission signal are signals error-correction coded in the transmission source, and the signal detection unit generates, when the signal is detected, a replica signal of an interference component to a signal serving as a detection target by using a signal obtained by performing an error correction decoding process using an error correction code on the signal detected by the communication device, and removes the replica signal from the signal received by the reception unit.

5. The communication device according to claim 1, wherein the signal detection unit removes, when the signal is detected, an interference component from the signal received by the reception unit by using all signals detected by the signal detection unit.

6. The communication device according to claim 1, wherein the signal detection unit removes, when the retransmission signal is detected, an interference component from the signal received by the reception unit by using the initial transmission signal among signals detected by the signal detection unit.

7. The communication device according to claim 1, wherein the signal received by the reception unit is a code-multiplexed signal in which the initial transmission signal and the retransmission signal are respectively multiplied by unique spreading codes, and
the signal detection unit removes an interference component from the signal received by the reception unit, multiplies the signal from which the interference component is removed by the spreading code unique to a signal serving as a detection target, and detects the signal serving as the detection target.

8. The communication device according to claim 1, wherein the signal received by the reception unit is a signal in which the initial transmission signal and the retransmission signal are transmitted from different antennas and spatially multiplexed, and
the signal detection unit removes an interference component from the signal received by the reception unit and detects, based on a channel estimation value of each antenna, a signal serving as a detection target from the signal from which the interference component is removed.

9. The communication device according to claim 1, wherein the signal detection unit performs detection of the initial transmission signal and the retransmission signal for each signal once according to the order decided by the detection order decision unit.

10. The communication device according to claim 1, wherein the signal detection unit iterates detection of the initial transmission signal and the retransmission signal a plurality of times according to the order decided by the detection order decision unit.

11. The communication device according to claim 1, wherein the signal detection unit outputs a soft decision value of a detected signal, and
the communication device comprises:
a received signal storage unit that stores the soft decision value outputted by the signal detection unit; and
a combining unit that combines the soft decision value outputted by the signal detection unit with a soft decision value of an initial transmission signal for the signal of the soft decision value outputted by the signal detection unit or a soft decision value of a retransmission signal for the initial transmission signal among soft decision values stored in the received signal storage unit.

12. The communication device according to claim 11, wherein the soft decision value outputted by the signal detection unit is a demodulation result.

13. The communication device according to claim 11, wherein the soft decision value outputted by the signal detection unit is a decoding result.

14. The communication device according to claim 1, wherein the information for determining the initial transmission signal or the retransmission signal is information indicating the number of retransmissions.

15. The communication device according to claim 1, wherein the reception unit receives a received signal including a retransmission control signal, and
the information for determining the initial transmission signal or the retransmission signal is written to the retransmission control signal.

16. A communication system which includes a first communication device and a second communication device, and performs a hybrid automatic repeat request process in which the second communication device requests the first communication device to perform retransmission when an error is detected from a signal received from the first communication device,
the second communication device comprising:
a reception unit that receives a signal into which an initial transmission signal and a retransmission signal are multiplexed among signals including the initial transmission signal and the retransmission signal for any one signal;
a detection order decision unit that decides an order of detection of the initial transmission signal and the retransmission signal from the signal received by the reception unit in response to information for determining the initial transmission signal or the retransmission signal from the initial transmission signal and the retransmission signal which are received by the reception unit; and
a signal detection unit that removes an interference component from the signal received by the reception unit by using a signal detected by the communication device according to the order decided by the detection order decision unit, and detecting the initial transmission signal and the retransmission signal.

17. The communication system according to claim 16, wherein the initial transmission signal and the retransmission signal are signals of error correction-coded information, and
the signal detection unit generates, when the signal is detected, a replica signal of an interference component to a signal serving as a detection target by using a signal obtained by performing an error correction decoding process using the error correction code on the signal detected by the device, and removes the replica signal from the signal received by the reception unit.

18. A communication method for a communication device which performs a hybrid automatic repeat request process of requesting a transmission source to perforin retransmission when an error is detected from a received signal, the communication method comprising:
a first process of receiving, by the communication device, a signal into which an initial transmission signal and a retransmission signal are multiplexed among signals including the initial transmission signal and the retransmission signal for any one signal;
a second process of deciding, by the communication device, an order of detection of the initial transmission signal and the retransmission signal from the signal received in the first process in response to information for determining the initial transmission signal or the retransmission signal from the initial transmission signal and the retransmission signal which are received in the first process; and
a third process of removing, by the communication device, an interference component from the signal received in the first process by using a signal detected by the communication device according to the order decided in the second process, and detecting the initial transmission signal and the retransmission signal.

19. A communication method for a communication system which includes a first communication device and a second communication device, and performs a hybrid automatic repeat request process in which the second communication device requests the first communication device to perform retransmission when an error is detected from a signal received from the first communication device, the communication method comprising:
- a first process of transmitting, by the first communication device, an initial transmission signal and a retransmission signal for any one signal;
- a second process of receiving, by the second communication device, a signal into which the initial transmission signal and the retransmission signal are multiplexed among signals transmitted in the first process;
- a third process of deciding, by the second communication device, an order of detection of the initial transmission signal and the retransmission signal from the signal received in the second process in response to information for determining the initial transmission signal or the retransmission signal from the initial transmission signal and the retransmission signal which are received in the second process; and
- a fourth process of removing, by the second communication device, an interference component from the signal received in the second process by using a signal detected by the second communication device according to the order decided in the third process, and detecting the initial transmission signal and the retransmission signal.

20. The communication device according to claim 14, wherein the detection order decision unit decides the order of detection such that signals are detected in a descending order of the number of retransmissions.

* * * * *